US012555586B2

(12) United States Patent
Gao et al.

(10) Patent No.: US 12,555,586 B2
(45) Date of Patent: Feb. 17, 2026

(54) METHOD AND APPARATUS FOR ENCODING THREE-DIMENSIONAL AUDIO SIGNAL, ENCODER, AND SYSTEM

(71) Applicant: HUAWEI TECHNOLOGIES CO., LTD., Guangdong (CN)

(72) Inventors: Yuan Gao, Beijing (CN); Shuai Liu, Beijing (CN); Bingyin Xia, Beijing (CN); Bin Wang, Shenzhen (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 18/538,708

(22) Filed: Dec. 13, 2023

(65) Prior Publication Data

US 2024/0119950 A1 Apr. 11, 2024

Related U.S. Application Data

(63) Continuation of application No. PCT/CN2022/096476, filed on May 31, 2022.

(30) Foreign Application Priority Data

Jun. 18, 2021 (CN) ......................... 202110680341.8

(51) Int. Cl.
*G10L 19/008* (2013.01)
*G10L 25/21* (2013.01)
*H04S 7/00* (2006.01)

(52) U.S. Cl.
CPC ............ *G10L 19/008* (2013.01); *G10L 25/21* (2013.01); *H04S 7/30* (2013.01)

(58) Field of Classification Search
CPC ..... G10L 19/00; G10L 19/002; G10L 19/008; G10L 19/04; G10L 19/167; G10L 19/18;
(Continued)

(56) References Cited

U.S. PATENT DOCUMENTS 9,002,716 B2 * 4/2015 Spille ......................... H04S 3/00 381/17
9,154,877 B2 * 10/2015 Kim ......................... H04R 5/00
(Continued)

FOREIGN PATENT DOCUMENTS

CN 105940447 B 3/2020
CN 114582357 A 6/2022
WO 2020105423 A1 5/2020

OTHER PUBLICATIONS

3rd Generation Partnership Project; Technical Specification Group Services and System Aspects; Codec for Immersive Voice and Audio Services; General overview (Release 18). 3GPP TS 26.250 V1.0.0 (Sep. 2023). total 12 pages.

*Primary Examiner* — Gerald Gauthier
(74) *Attorney, Agent, or Firm* — WOMBLE BOND DICKINSON (US) LLP

(57) ABSTRACT

A method for encoding a three-dimensional audio signal is provided. The method includes: An encoder obtains a current frame of a three-dimensional audio signal; obtains coding efficiency of an initial virtual speaker for the current frame based on the current frame of the three-dimensional audio signal; and when the coding efficiency of the initial virtual speaker for the current frame meets a preset condition, determines an updated virtual speaker for the current frame from a set of candidate virtual speakers; encodes the current frame based on the updated virtual speaker for the current frame, to obtain a first bitstream; or when the coding efficiency of the initial virtual speaker for the current frame does not meet the preset condition, encodes the current frame based on the initial virtual speaker for the current frame, to obtain a second bitstream.

19 Claims, 13 Drawing Sheets

(58) Field of Classification Search
CPC ......... G10L 19/20; G10L 19/22; G10L 19/24; G10L 25/21; G10L 19/0204; G10L 19/087; G10L 19/265; G10L 21/0364; H04H 20/89; H04R 3/12; H04R 5/00; H04R 27/00; H04R 3/04; H04S 3/02; H04S 5/005; H04S 7/00; H04S 7/30; H04S 7/302; H04S 7/305; H04S 7/308; H04S 2400/15; H04S 1/005; H04S 3/00; H04S 3/008; H04S 7/307; G10H 1/0091
See application file for complete search history.

(56) References Cited

U.S. PATENT DOCUMENTS 9,530,421 B2* 12/2016 Jot .......................... G10L 19/20
9,980,074 B2* 5/2018 Sen .......................... H04S 5/005
10,672,405 B2* 6/2020 Hines .......................... H04S 3/02
11,395,083 B2* 7/2022 Schevciw .............. H04S 7/308
11,587,572 B2* 2/2023 Wang .......................... G10L 19/22
11,783,843 B2* 10/2023 Fuchs .................. G10L 19/0204 704/500
2003/0138108 A1* 7/2003 Gentle .................. H04R 27/00 381/23
2004/0088169 A1* 5/2004 Smith .................. G10H 1/0091 704/500
2008/0140426 A1* 6/2008 Kim .................... G10L 19/087 704/E19.042
2009/0177479 A1* 7/2009 Yoon .................... G10L 19/008 704/500
2009/0210238 A1* 8/2009 Kim ...................... G10L 19/20 704/500
2010/0191537 A1* 7/2010 Breebaart .............. H04S 3/008 704/500
2010/0241439 A1* 9/2010 Mouhssine ........... G10L 19/008 704/500
2010/0305952 A1* 12/2010 Mouhssine ............. G10L 19/24 704/500
2011/0173011 A1* 7/2011 Geiger .................... G10L 19/04 704/500
2011/0202355 A1* 8/2011 Grill ...................... G10L 19/18 704/E21.001
2011/0246207 A1* 10/2011 Choi .................... G10L 19/008 704/500
2011/0264456 A1* 10/2011 Koppens ................ H04S 1/005 704/500
2011/0305344 A1* 12/2011 Sole .................... G10L 19/008 381/23
2014/0025386 A1* 1/2014 Xiang .................... G10L 19/00 704/500
2014/0310010 A1* 10/2014 Seo ...................... G10L 19/008 704/500
2014/0350944 A1* 11/2014 Jot .......................... G10L 19/20 704/500
2014/0355796 A1* 12/2014 Xiang .................... H04S 7/305 381/303
2014/0358564 A1 12/2014 Sen et al.
2015/0131824 A1* 5/2015 Nguyen .................. H04S 7/307 381/300
2015/0142453 A1* 5/2015 Oomen ................ G10L 19/265 704/500
2015/0149187 A1* 5/2015 Kastner ................ G10L 19/008 704/500
2015/0154965 A1* 6/2015 Wuebbolt ............ G10L 19/008 704/500
2015/0154971 A1* 6/2015 Boehm ..................... H04S 3/02 704/500
2015/0170657 A1* 6/2015 Thompson ............ G10L 19/008 704/500
2015/0194161 A1* 7/2015 Najaf-Zadeh ....... G10L 21/0364 704/500
2015/0199973 A1* 7/2015 Borsum ................ G10L 19/008 704/500
2015/0213803 A1* 7/2015 Peters .................. G10L 19/008 704/500
2015/0332683 A1* 11/2015 Kim ...................... G10L 19/008 704/500
2015/0340043 A1* 11/2015 Koppens ................ H04S 3/008 704/500
2016/0035356 A1* 2/2016 Morrell .................. H04H 20/89 704/500
2016/0163321 A1* 6/2016 Arnott .................. G10L 19/167 704/500
2018/0308500 A1 10/2018 Krueger et al.
2019/0147892 A1* 5/2019 Setiawan .............. G10L 19/008 704/500
2019/0239015 A1 8/2019 Schevciw et al.
2020/0176001 A1* 6/2020 Wang .................... G10L 19/008
2022/0139409 A1* 5/2022 Fuchs ...................... H04R 3/12 704/500
2023/0133252 A1* 5/2023 Gao ...................... G10L 19/002 704/500
2023/0298601 A1* 9/2023 Gao ...................... G10L 19/008 704/500
2024/0119950 A1* 4/2024 Gao .......................... H04S 7/30

* cited by examiner

METHOD AND APPARATUS FOR ENCODING THREE-DIMENSIONAL AUDIO SIGNAL, ENCODER, AND SYSTEM

CROSS-REFERENCE TO RELATED APPLICATIONS

This application is a continuation of International Application No. PCT/CN2022/096476, filed on May 31, 2022, which claims priority to Chinese Patent Application No. 202110680341.8, filed on Jun. 18, 2021. The disclosures of the aforementioned applications are hereby incorporated by reference in their entirety.

TECHNICAL FIELD

This application relates to the multimedia field, and in particular, to a method and an apparatus for encoding a three-dimensional audio signal, an encoder, and a system.

BACKGROUND

With rapid development of high-performance computers and signal processing technologies, listeners pose increasingly high requirements for voice and audio experience. Immersive audio can meet people's requirements for the voice and audio experience. For example, a three-dimensional audio technology is widely applied to wireless communication (for example, 4G/5G) voice, virtual reality/augmented reality, media audio, and the like. The three-dimensional audio technology is an audio technology that obtains, processes, transmits, renders, and plays back sound and three-dimensional sound field information in the real world, so that the sound presents a strong sense of space, encirclement, and immersion, providing a listener with an extraordinary auditory experience of "being there".

Generally, an acquisition device (for example, a microphone) acquires a large amount of data to record three-dimensional sound field information, and transmits a three-dimensional audio signal to a playback device (for example, a speaker or an earphone), so that the playback device plays three-dimensional audio. A large data amount of the three-dimensional sound field information requires a large storage space. In addition, a high bandwidth is required for transmitting the three-dimensional audio signal. To resolve the foregoing problems, the three-dimensional audio signal may be compressed, and compressed data may be stored or transmitted. Currently, an encoder uses a virtual speaker to compress the three-dimensional audio signal. However, if the virtual speaker used by the encoder to encode different frames of the three-dimensional audio signal is subject to large fluctuation, a reconstructed three-dimensional audio signal consequently has low quality and poor sound quality. Therefore, how to improve quality of a reconstructed three-dimensional audio signal is an urgent problem to be resolved.

SUMMARY

This application provides a method and an apparatus for encoding a three-dimensional audio signal, an encoder, and a system, to improve quality of a reconstructed three-dimensional audio signal.

According to a first aspect, this application provides a method for encoding a three-dimensional audio signal. The method is executed by an encoder, and may include the following operations: After obtaining a current frame of a three-dimensional audio signal, the encoder obtains coding efficiency of an initial virtual speaker for the current frame based on the current frame of the three-dimensional audio signal. The coding efficiency represents a capability of the initial virtual speaker for the current frame to reconstruct a sound field to which the three-dimensional audio signal belongs. If the coding efficiency of the initial virtual speaker for the current frame meets a preset condition, it indicates that the initial virtual speaker for the current frame cannot fully express sound field information of the three-dimensional audio signal, and the capability of the initial virtual speaker for the current frame to reconstruct the sound field to which the three-dimensional audio signal belongs is weak. In this case, the encoder determines an updated virtual speaker for the current frame from a set of candidate virtual speakers, and encodes the current frame based on the updated virtual speaker for the current frame, to obtain a first bitstream. If the coding efficiency of the initial virtual speaker for the current frame does not meet the preset condition, it indicates that the initial virtual speaker for the current frame fully expresses the sound field information of the three-dimensional audio signal, and the capability of the initial virtual speaker for the current frame to reconstruct the sound field to which the three-dimensional audio signal belongs is strong. In this case, the encoder encodes the current frame based on the initial virtual speaker for the current frame, to obtain a second bitstream. Both the initial virtual speaker for the current frame and the updated virtual speaker for the current frame belong to the set of candidate virtual speakers.

In this way, after obtaining the initial virtual speaker for the current frame, the encoder determines the coding efficiency of the initial virtual speaker, and determines, based on the capability, indicated by the coding efficiency, of the initial virtual speaker to reconstruct the sound field to which the three-dimensional audio signal belongs, whether to reselect a virtual speaker for the current frame. When the coding efficiency of the initial virtual speaker for the current frame meets the preset condition, that is, in a scenario in which the initial virtual speaker for the current frame cannot fully represent a sound field to which a reconstructed three-dimensional audio signal belongs, the virtual speaker for the current frame is reselected, and the updated virtual speaker for the current frame is used as the virtual speaker for encoding the current frame. Therefore, the reselection of a virtual speaker reduces fluctuation of the virtual speaker used for encoding different frames of the three-dimensional audio signal, and thus improves quality of a reconstructed three-dimensional audio signal at a decoder side, and improves sound quality of a sound played at the decoder side.

In an embodiment, the encoder may obtain the coding efficiency of the initial virtual speaker for the current frame in any one of the following four manners:

Manner 1: That the encoder obtains coding efficiency of an initial virtual speaker for the current frame based on the current frame of the three-dimensional audio signal includes: The encoder obtains a reconstructed current frame of a reconstructed three-dimensional audio signal based on the initial virtual speaker for the current frame, and then determines the coding efficiency of the initial virtual speaker for the current frame based on energy of the reconstructed current frame and energy of the current frame. Because the reconstructed current frame of the reconstructed three-dimensional audio signal is determined by the initial virtual speaker for the current frame that expresses the sound field information of the three-dimensional audio signal, the encoder can intuitively and accurately determine, based on a ratio of the energy of the reconstructed current frame to the energy of the current frame, the capability of the initial virtual speaker to reconstruct the sound field to which the three-dimensional audio signal belongs, thereby ensuring accuracy of determining, by the encoder, the coding efficiency of the initial virtual speaker for the current frame. For example, if the energy of the reconstructed current frame is less than half of the energy of the current frame, it indicates that the initial virtual speaker for the current frame cannot fully express the sound field information of the three-dimensional audio signal, and the capability of the initial virtual speaker for the current frame to reconstruct the sound field to which the three-dimensional audio signal belongs is weak.

Manner 2: That the encoder obtains coding efficiency of an initial virtual speaker for the current frame based on the current frame of the three-dimensional audio signal includes: The encoder determines a reconstructed current frame of a reconstructed three-dimensional audio signal based on the initial virtual speaker for the current frame, and then obtains a residual signal of the current frame based on the current frame and the reconstructed current frame. The encoder determines the coding efficiency of the initial virtual speaker for the current frame based on a ratio of energy of a virtual speaker signal of the current frame to a sum of the energy of the virtual speaker signal of the current frame and energy of the residual signal. It should be noted that the sum of the energy of the virtual speaker signal of the current frame and the energy of the residual signal may be a signal to be transmitted by the encoder side. Therefore, the encoder may indirectly determine, based on a ratio of the energy of the virtual speaker signal of the current frame and energy of a to-be-transmitted signal, the capability of the initial virtual speaker to reconstruct the sound field to which the three-dimensional audio signal belongs, thereby avoiding determining, by the encoder, the reconstructed current frame. This reduces complexity of determining, by the encoder, the coding efficiency of the initial virtual speaker for the current frame. For example, if the energy of the virtual speaker signal of the current frame is less than half of the energy of the to-be-transmitted signal, it indicates that the initial virtual speaker for the current frame cannot fully express the sound field information of the three-dimensional audio signal, and the capability of the initial virtual speaker for the current frame to reconstruct the sound field to which the three-dimensional audio signal belongs is weak.

That the encoder obtains a reconstructed current frame of a reconstructed three-dimensional audio signal based on the initial virtual speaker for the current frame includes: determining the virtual speaker signal of the current frame based on the initial virtual speaker for the current frame; and determining the reconstructed current frame based on the virtual speaker signal of the current frame. For example, the energy of the reconstructed current frame is determined based on a coefficient of the reconstructed current frame, and the energy of the current frame is determined based on a coefficient of the current frame.

Manner 3: That the encoder obtains coding efficiency of an initial virtual speaker for the current frame based on the current frame of the three-dimensional audio signal includes: The encoder determines a quantity of sound sources based on the current frame of the three-dimensional audio signal; and determines the coding efficiency of the initial virtual speaker for the current frame based on a ratio of a quantity of initial virtual speakers for the current frame to the quantity of sound sources.

Manner 4: That the encoder obtains coding efficiency of an initial virtual speaker for the current frame based on the current frame of the three-dimensional audio signal includes: The encoder determines a quantity of sound sources based on the current frame of the three-dimensional audio signal; determining a virtual speaker signal of the current frame based on the initial virtual speaker for the current frame; and determining the coding efficiency of the initial virtual speaker for the current frame based on a ratio of a quantity of virtual speaker signals of the current frame to the quantity of sound sources.

Because the initial virtual speaker for the current frame is used to reconstruct the sound field to which the three-dimensional audio signal belongs, the initial virtual speaker for the current frame may represent information about the sound field to which the three-dimensional audio signal belongs. The encoder determines the coding efficiency of the initial virtual speaker for the current frame by using a relationship between the quantity of initial virtual speakers for the current frame and the quantity of sound sources of the three-dimensional audio signal, or the encoder determines the coding efficiency of the initial virtual speaker for the current frame by using a relationship between the quantity of virtual speaker signals of the current frame and the quantity of sound sources of the three-dimensional audio signal. This can ensure accuracy of determining, by the encoder, the coding efficiency of the initial virtual speaker for the current frame, and reduce complexity of determining, by the encoder, the coding efficiency of the initial virtual speaker for the current frame.

When the encoder determines, through any one of the foregoing manner 1 to manner 4, that the coding efficiency of the initial virtual speaker for the current frame is less than a first threshold, that is, the coding efficiency of the initial virtual speaker for the current frame meets the preset condition, the encoder may determine the updated virtual speaker for the current frame according to the following embodiments. It may be understood that the preset condition includes that the coding efficiency of the initial virtual speaker for the current frame is less than the first threshold. A value range of the first threshold may be 0 to 1, or 0.5 to 1. For example, the first threshold may be 0.35, 0.65, 0.75, 0.85, or the like.

In an embodiment, that the encoder determines an updated virtual speaker for the current frame from a set of candidate virtual speakers includes: if the coding efficiency of the initial virtual speaker for the current frame is less than a second threshold, using a preset virtual speaker in the set of candidate virtual speakers as the updated virtual speaker for the current frame, where the second threshold is less than the first threshold.

In this way, in a scenario in which the initial virtual speaker for the current frame cannot fully represent a sound field to which the reconstructed three-dimensional audio signal belongs, and consequently, quality of the reconstructed three-dimensional audio signal at the decoder side is poor, the encoder determines the coding efficiency of the initial virtual speaker for the current frame twice, thereby further improving accuracy of determining, by the encoder, the capability of the initial virtual speaker to reconstruct the sound field to which the three-dimensional audio signal belongs. In addition, the encoder selects the updated virtual speaker for the current frame in a directional manner. This reduces fluctuation of the virtual speaker used for encoding different frames of the three-dimensional audio signal, and thus improves quality of the reconstructed three-dimensional audio signal at the decoder side, and improves sound quality of a sound played at the decoder side.

In another embodiment, that the encoder determines an updated virtual speaker for the current frame from a set of candidate virtual speakers includes: if the coding efficiency of the initial virtual speaker for the current frame is less than the first threshold and greater than the second threshold, using a virtual speaker for a previous frame as the updated virtual speaker for the current frame, where the virtual speaker for the previous frame is a virtual speaker used for encoding the previous frame of the three-dimensional audio signal. Because the encoder uses the virtual speaker for the previous frame as the virtual speaker for encoding the current frame, fluctuation of the virtual speaker used for encoding different frames of the three-dimensional audio signal is reduced, and thus quality of the reconstructed three-dimensional audio signal at the decoder side is improved, and sound quality of a sound played at the decoder side is improved.

In an embodiment, the method further includes: The encoder determines adjusted coding efficiency of the initial virtual speaker for the current frame based on the coding efficiency of the initial virtual speaker for the current frame and coding efficiency of the virtual speaker for the previous frame. If the coding efficiency of the initial virtual speaker for the current frame is greater than the adjusted coding efficiency of the initial virtual speaker for the current frame, it indicates that the initial virtual speaker for the current frame has a capability to represent the sound field to which the three-dimensional audio signal belongs. In this case, the initial virtual speaker for the current frame is used as a virtual speaker for a subsequent frame of the current frame. This reduces fluctuation of the virtual speaker used for encoding different frames of the three-dimensional audio signal, and thus improves quality of a reconstructed three-dimensional audio signal at the decoder side, and improves sound quality of a sound played at the decoder side.

In addition, the three-dimensional audio signal may be a higher-order ambisonics (HOA) signal.

According to a second aspect, this application provides an apparatus for encoding a three-dimensional audio signal. The apparatus includes modules configured to perform the method for encoding a three-dimensional audio signal in any one of the first aspect or the possible designs of the first aspect. For example, the apparatus for encoding a three-dimensional audio signal includes a communication module, a coding efficiency obtaining module, a virtual speaker reselection module, and an encoding module. The communication module is configured to obtain a current frame of a three-dimensional audio signal. The coding efficiency obtaining module is configured to obtain coding efficiency of an initial virtual speaker for the current frame based on the current frame of the three-dimensional audio signal. The initial virtual speaker for the current frame belongs to a set of candidate virtual speakers. The virtual speaker reselection module is configured to: if the coding efficiency of the initial virtual speaker for the current frame meets a preset condition, determine an updated virtual speaker for the current frame from the set of candidate virtual speakers. The encoding module is configured to encode the current frame based on the updated virtual speaker for the current frame, to obtain a first bitstream. The encoding module is further configured to: if the coding efficiency of the initial virtual speaker for the current frame does not meet the preset condition, encode the current frame based on the initial virtual speaker for the current frame, to obtain a second bitstream. These modules may perform corresponding functions in the method example in the first aspect. For details, refer to the detailed descriptions in the method example. Details are not described herein again.

According to a third aspect, this application provides an encoder. The encoder includes at least one processor and a memory. The memory is configured to store a group of computer instructions. When executing the group of computer instructions, the processor performs operations of the method for encoding a three-dimensional audio signal in any one of the first aspect or the embodiments of the first aspect.

According to a fourth aspect, this application provides a system. The system includes the encoder according to the third aspect and a decoder. The encoder is configured to perform operations of the method for encoding a three-dimensional audio signal in any one of the first aspect or the embodiments of the first aspect. The decoder is configured to decode a bitstream generated by the encoder.

According to a fifth aspect, this application provides a computer-readable storage medium, including computer software instructions. When the computer software instructions are run in an encoder, the encoder is enabled to perform operations of the method in any one of the first aspect or the embodiments of the first aspect.

According to a sixth aspect, this application provides a computer program product. When the computer program product runs on an encoder, the encoder is enabled to perform operations of the method in any one of the first aspect or the embodiments of the first aspect.

According to a seventh aspect, this application provides a computer-readable storage medium, including a bitstream obtained by using the method in any one of the first aspect or the embodiments of the first aspect.

This application may further combine the embodiments provided in the foregoing aspects to provide additional embodiments.

DESCRIPTION OF EMBODIMENTS

Figure 1:
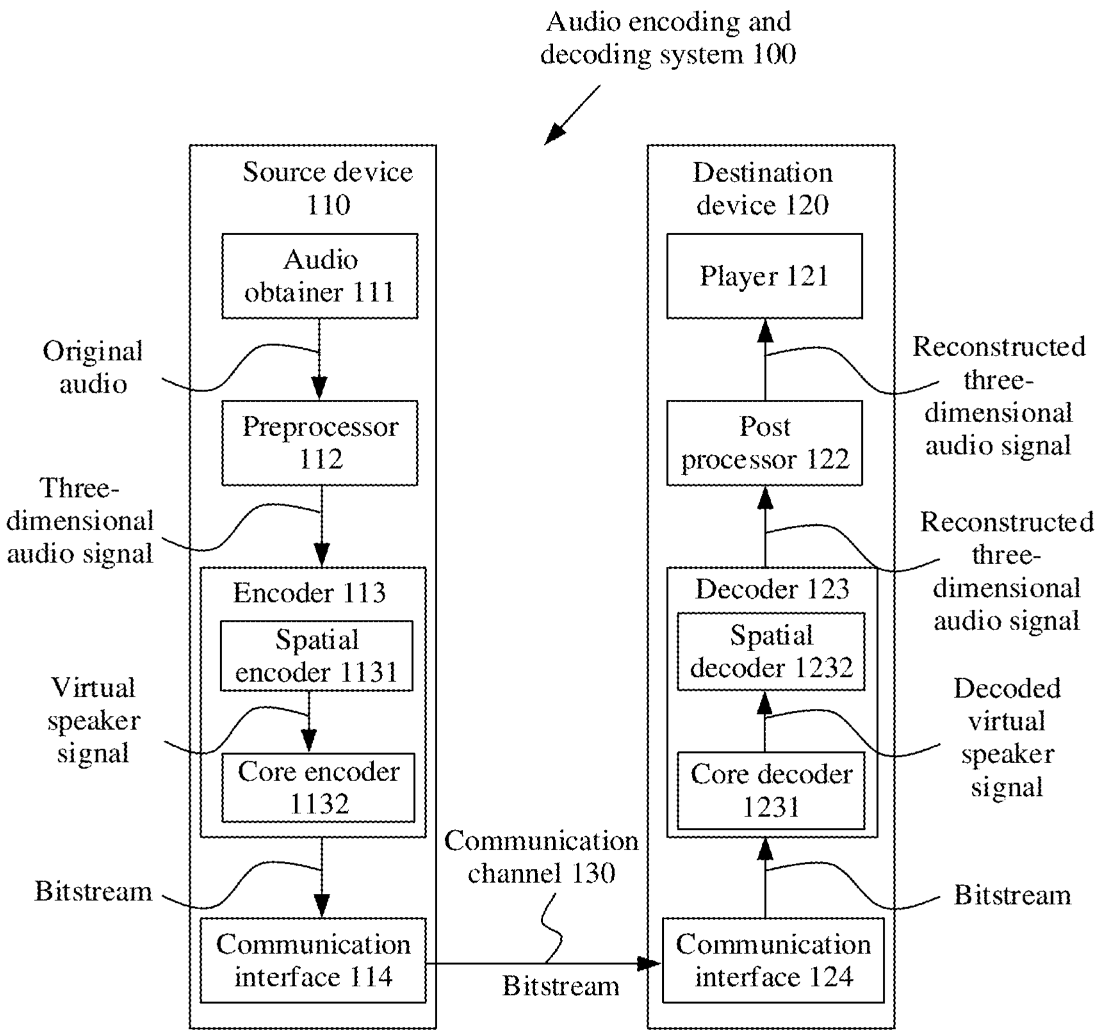
FIG. 1 is a schematic diagram of a structure of an audio encoding and decoding system according to an embodiment of this application.

For clear and brief description of the following embodiments, a conventional technology is first briefly described.

Sound is a continuous wave generated by vibration of an object. An object that creates vibration, which produces a sound wave, is referred to as a sound source. In a process in which a sound wave propagates through a medium (such as air, solid, or liquid), a human or animal's auditory organs can perceive the sound.

Characteristics of a sound wave include pitch, intensity, and timbre. Pitch indicates how "low" or "high" a sound is. Sound intensity indicates a volume of a sound. Sound intensity may also be referred to as loudness or volume. The unit of sound intensity is decibel (dB). Timbre also refers to as quality of a sound.

A frequency of a sound wave determines the pitch. A higher frequency indicates a higher pitch. A quantity of times an object vibrates within one second is called frequency. The unit of frequency is hertz (Hz). The frequency of a sound that can be heard by human ears ranges from 20 Hz to 20000 Hz.

An amplitude of the sound wave determines the intensity of the sound. A greater amplitude indicates greater sound intensity. A closer distance to the sound source indicates greater sound intensity.

A waveform of the sound wave determines the timbre. The waveform of the sound wave includes a square wave, a sawtooth wave, a sine wave, a pulse wave, and the like.

Sound can be classified into regular sound and irregular sound based on the characteristics of sound waves. The irregular sound is a sound generated by irregular vibrations of the sound source. The irregular sound is, for example, noise that affects people's work, study, rest, and the like. The regular sound is a sound generated regular vibrations of a sound source. The regular sound includes voice and a musical tone. When the sound is represented by electricity, the regular sound is an analog signal that changes continuously in time-frequency domain. The analog signal may be referred to as an audio signal. An audio signal is an information carrier that carries voice, music, and a sound effect.

Because an auditory sense of a human has a capability of perceiving position distribution of a sound source in space, when hearing a sound in space, a listener can perceive a direction of the sound in addition to pitch, sound intensity, and timbre of the sound.

With increasing attention to and quality requirements on auditory system experience, a three-dimensional audio technology emerges to enhance a sense of depth, a sense of immersion, and a sense of space of a sound. In this way, the listener not only perceives sounds of sound sources from the front, the back, the left, and the right, but also has the feeling that space in which the listener is located is surrounded by spatial sound fields ("sound field" (sound field) for short) generated by these sound sources, and that the sounds propagate in all directions, thereby creating a sound effect of "being there" in a place such as a cinema or a concert hall for the listener.

In the three-dimensional audio technology, space outside a human ear is assumed as a system, and a signal received at an eardrum is a three-dimensional audio signal that is output after a sound of a sound source is filtered by the system outside the ear. For example, the system outside the human ear may be defined as a system impulse response h(n), any sound source may be defined as x(n), and a signal received at the eardrum is a convolution result of x(n) and h(n). The three-dimensional audio signal in embodiments of this application may be a higher-order ambisonics (HOA) signal. The three-dimensional audio may also be referred to as a three-dimensional sound effect, spatial audio, three-dimensional sound field reconstruction, virtual 3D audio, binaural audio, or the like.

It is well known that when a sound wave is propagated in an ideal medium, a wavenumber is k=w/c, and an angular frequency is w=2πf, where f represents frequency of sound wave, and c represents speed of sound. Sound pressure p satisfies formula (1), where $\nabla^2$ is a Laplace operator.

$$\nabla^2 p+k^2 p=0 \qquad \text{formula (1)}$$

It is assumed that the space system outside the human ear is a sphere, with the listener located at the center of the sphere and sounds from outside of the sphere projected on a surface of the sphere. Sounds outside the surface of the sphere are filtered out. It is assumed that a sound source is distributed on the surface of the sphere, and a sound field generated by the sound source on the surface of the sphere is used to approximate a sound field generated by the original sound source. In other words, the three-dimensional audio technology is a method for approximating a sound field. In an embodiment, the equation in formula (1) is solved in a spherical coordinate system. In a passive spherical region, the equation in formula (1) is solved as the following formula (2):

$$p(r,\theta,\varphi,k)=s\Sigma_{m=0}^{\infty}(2m+1)j^m j_m^{kr}(kr)\Sigma_{0\le n\le m,\sigma=\pm1}Y_{m,n}^{\sigma}(\theta_s,\varphi_s)Y_{m,n}^{\sigma}(\theta,\varphi) \qquad \text{formula (2),}$$

where r represents a sphere radius, θ represents an azimuth angle, φ represents an elevation angle, k represents the wavenumber, s represents an amplitude of an ideal plane wave, m represents an order number of a three-dimensional audio signal (or referred to as an order number of an HOA signal), $j^m j_m^{kr}(kr)$ represents a spherical Bessel function, which is also referred to as a radial basis function, where the first j represents imaginary unit, $(2m+1)j^m j_m^{kr}(kr)$ does not change with angle, $Y_{m,n}^{\sigma}(\theta,\varphi)$ represents a spherical harmonic function in a direction (θ,φ), and $Y_{m,n}^{\sigma}(\theta_s,\varphi_s)$ represents a spherical harmonic function in a direction of the sound source. A coefficient of the three-dimensional audio signal satisfies formula (3).

$$B_{m,n}^{\sigma}=s\cdot Y_{m,n}^{\sigma}(\theta_s,\varphi_s) \qquad \text{formula (3)}$$

Formula (3) is substituted into formula (2), and formula (2) may be transformed into formula (4).

$$p(r,\theta,\varphi,k)=s\Sigma_{m=0}^{\infty}j^m j_m^{kr}(kr)\Sigma_{0\le n\le m,\sigma=\pm1}B_{m,n}^{\sigma}(\theta,\varphi) \qquad \text{formula (4),}$$

where $B_{m,n}^{\sigma}$ represents a coefficient of an N-order three-dimensional audio signal, and is used to approximately describe a sound field. The sound field is an area, in a medium, in which a sound wave exists. N is an integer greater than or equal to 1. For example, a value of N is an integer ranging from 2 to 6. The coefficient of the three-dimensional audio signal in embodiments of this application may be a HOA coefficient or an ambisonics (ambisonics) coefficient.

The three-dimensional audio signal is an information carrier that carries spatial position information of a sound source in a sound field, and describes a sound field surrounding a listener in space. Formula (4) shows that the sound field may be expanded on the surface of the sphere according to a spherical harmonic function, that is, the sound field may be decomposed into superposition of a plurality of plane waves. Therefore, the sound field described by the three-dimensional audio signal may be expressed by superposition of a plurality of plane waves, and the sound field is reconstructed by using the coefficient of the three-dimensional audio signal.

Compared with a 5.1-channel audio signal or a 7.1-channel audio signal, because an N-order HOA signal has $(N+1)^2$ channels, the HOA signal includes a larger amount of data for describing spatial information of the sound field. If an acquisition device (for example, a microphone) transmits the three-dimensional audio signal to a playback device (for example, a speaker), large bandwidth needs to be consumed. Currently, an encoder may perform compression coding on a three-dimensional audio signal through spatial squeezed surround audio coding (S3AC) or directional audio coding (DirAC) to obtain a bitstream, and transmit the bitstream to the playback device. The playback device decodes the bitstream, reconstructs a three-dimensional audio signal, and plays a reconstructed three-dimensional audio signal. This reduces an amount of data for transmitting the three-dimensional audio signal to the playback device and reduces bandwidth occupation. However, calculation complexity of performing compression coding by the encoder on the three-dimensional audio signal is high, which occupies excessive computing resources of the encoder. Therefore, how to reduce calculation complexity of performing compression coding on a three-dimensional audio signal is an urgent problem to be resolved.

Embodiments of this application provide an audio encoding and decoding technology, and in particular, provide a three-dimensional audio encoding and decoding technology oriented to a three-dimensional audio signal. In an embodiment, an encoding and decoding technology in which fewer channels are used to represent a three-dimensional audio signal is provided, to improve a conventional audio encoding and decoding system. Audio coding (or coding in general) includes two parts: audio encoding and audio decoding. Audio encoding is performed at a source side and generally includes processing (for example, compressing) original audio to reduce an amount of data for representing the original audio, to achieve more efficient storage and/or transmission. Audio decoding is performed at a destination side and generally includes inverse processing relative to an encoder to reconstruct the original audio. The encoding part and the decoding part are also collectively referred to as coding. The following describes implementations of embodiments of this application in detail with reference to accompanying drawings.

FIG. 1 is a schematic diagram of a structure of an audio encoding and decoding system according to an embodiment of this application. The audio encoding and decoding system 100 includes a source device 110 and a destination device 120. The source device 110 is configured to perform compression coding on a three-dimensional audio signal to obtain a bitstream, and transmit the bitstream to the destination device 120. The destination device 120 decodes the bitstream, reconstructs a three-dimensional audio signal, and plays a reconstructed three-dimensional audio signal.

In an embodiment, the source device 110 includes an audio obtainer 111, a preprocessor 112, an encoder 113, and a communication interface 114.

The audio obtainer 111 is configured to obtain original audio. The audio obtainer 111 may be any type of audio acquisition device configured to capture a sound of the real world, and/or any type of audio generation device. The audio obtainer 111 is, for example, a computer audio processor configured to generate computer audio. The audio obtainer 111 may also be any type of internal memory or memory that stores audio. Audio includes a sound of the real world, a virtual scene (for example, virtual reality (VR) or augmented reality (AR)) sound, and/or any combination thereof.

The preprocessor 112 is configured to receive the original audio acquired by the audio obtainer 111, and preprocess the original audio to obtain a three-dimensional audio signal. For example, preprocessing performed by the preprocessor 112 includes channel conversion, audio format conversion, noise reduction, or the like.

The encoder 113 is configured to receive the three-dimensional audio signal generated by the preprocessor 112, and perform compression coding on the three-dimensional audio signal to obtain a bitstream. For example, the encoder 113 may include a spatial encoder 1131 and a core encoder 1132. The spatial encoder 1131 is configured to select (or referred to as search for) a virtual speaker from a set of candidate virtual speakers based on the three-dimensional audio signal, and generate a virtual speaker signal based on the three-dimensional audio signal and the virtual speaker. The virtual speaker signal may also be referred to as a playback signal. The core encoder 1132 is configured to encode the virtual speaker signal to obtain a bitstream.

The communication interface 114 is configured to receive the bitstream generated by the encoder 113, and send the bitstream to the destination device 120 through a communication channel 130, so that the destination device 120 reconstructs a three-dimensional audio signal based on the bitstream.

The destination device 120 includes a player 121, a post processor 122, a decoder 123, and a communication interface 124.

The communication interface 124 is configured to receive the bitstream sent by the communication interface 114, and transmit the bitstream to the decoder 123, so that the decoder 123 reconstructs a three-dimensional audio signal based on the bitstream.

The communication interface 114 and the communication interface 124 may be configured to send or receive related data of the original audio through a direct communication link, for example, a direct wired or wireless connection, between the source device 110 and the destination device 120; or through any type of network, for example, a wired network, a wireless network, or any combination thereof, or any type of private network or public network, or any type of combination thereof.

Both the communication interface 114 and the communication interface 124 may be configured as unidirectional communication interfaces as indicated by an arrow for the communication channel 130 pointing from the source device 110 to the destination device 120 in FIG. 1, or bi-directional communication interfaces. The two communication interfaces may be configured to send and receive messages and the like, to establish a connection, acknowledge and exchange any other information related to the communication link and/or data transmission such as transmission of an encoded bitstream, and perform other operations.

The decoder 123 is configured to decode the bitstream, and reconstruct a three-dimensional audio signal. For example, decoder 123 includes a core decoder 1231 and a spatial decoder 1232. The core decoder 1231 is configured to decode the bitstream to obtain a decoded virtual speaker signal. The spatial decoder 1232 is configured to reconstruct a three-dimensional audio signal based on the set of candidate virtual speakers and the decoded virtual speaker signal, to obtain a reconstructed three-dimensional audio signal.

The post processor 122 is configured to receive the reconstructed three-dimensional audio signal generated by the decoder 123, and perform post-processing on the reconstructed three-dimensional audio signal. For example, post-processing performed by the post processor 122 includes audio rendering, loudness normalization, user interaction, audio format conversion, noise reduction, or the like.

The player 121 is configured to play a reconstructed sound based on the reconstructed three-dimensional audio signal.

It should be noted that the audio obtainer 111 and the encoder 113 may be integrated into one physical device, or may be disposed on different physical devices. This is not limited. For example, the source device 110 shown in FIG. 1 includes the audio obtainer 111 and the encoder 113, indicating that the audio obtainer 111 and the encoder 113 are integrated into one physical device. In this case, the source device 110 may also be referred to as an acquisition device. The source device 110 is, for example, a media gateway of a radio access network, a media gateway of a core network, a transcoding device, a media resource server, an AR device, a VR device, a microphone, or another audio acquisition device. If the source device 110 does not include the audio obtainer 111, it indicates that the audio obtainer 111 and the encoder 113 are two different physical devices, and the source device 110 may obtain original audio from another device (for example, an audio acquisition device or an audio storage device).

In addition, the player 121 and the decoder 123 may be integrated into one physical device, or may be disposed on different physical devices. This is not limited. For example, the destination device 120 shown in FIG. 1 includes the player 121 and the decoder 123, indicating that the player 121 and the decoder 123 are integrated on one physical device. In this case, the destination device 120 may also be referred to as a playback device, and the destination device 120 has functions of decoding and playing reconstructed audio. The destination device 120 is, for example, a speaker, a headset, or another audio playback device. If the destination device 120 does not include the player 121, it indicates that the player 121 and the decoder 123 are two different physical devices. After decoding the bitstream to reconstruct a three-dimensional audio signal, the destination device 120 transmits a reconstructed three-dimensional audio signal to another playback device (for example, a speaker or a headset). Then, the another playback device plays back the reconstructed three-dimensional audio signal.

In addition, FIG. 1 shows that the source device 110 and the destination device 120 may be integrated into one physical device. Alternatively, the two devices may be disposed on different physical devices. This is not limited.

Figure 2:
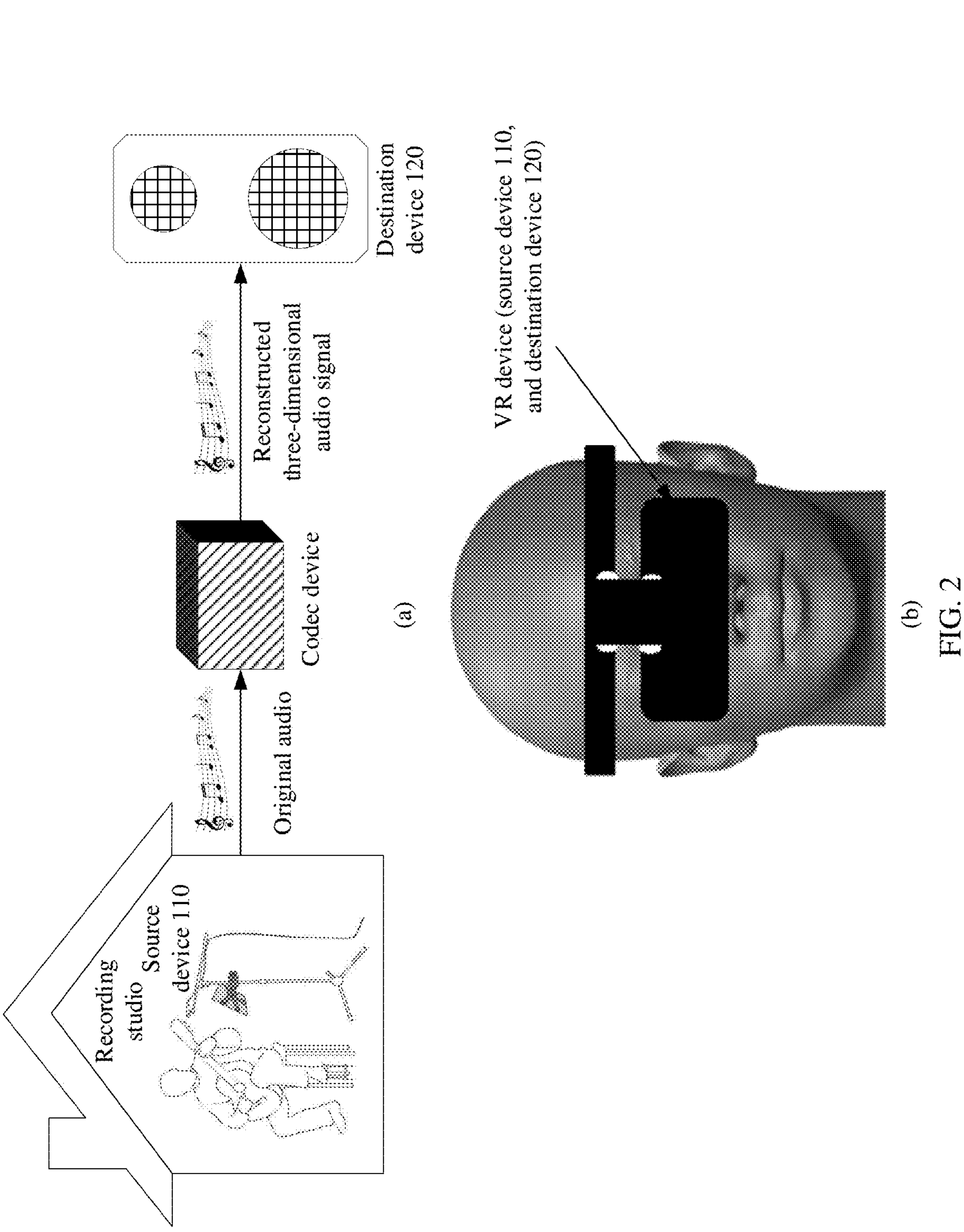
FIG. 2 is a schematic diagram of a scenario of an audio encoding and decoding system according to an embodiment of this application.

For example, as shown in (a) in FIG. 2, the source device 110 may be a microphone in a recording studio, and the destination device 120 may be a speaker. The source device 110 may acquire original audio of various musical instruments, and transmit the original audio to a codec device. The codec device performs encoding and decoding on the original audio to obtain a reconstructed three-dimensional audio signal. The destination device 120 plays back the reconstructed three-dimensional audio signal. For another example, the source device 110 may be a microphone in a terminal device, and the destination device 120 may be a headset. The source device 110 may acquire an external sound or audio synthesized by the terminal device.

For another example, as shown in (b) in FIG. 2, the source device 110 and the destination device 120 are integrated into a VR device, an AR device, a mixed reality (MR) device, or an extended reality (ER) device. In this case, the VR/AR/MR/ER device has functions of acquiring original audio, playing back audio, and encoding and decoding. The source device 110 may acquire a sound generated by a user and a sound generated by a virtual object in a virtual environment in which the user is located.

In such embodiments, the source device 110 or the corresponding functions and the destination device 120 or the corresponding functions may be implemented by using same hardware and/or software or by using separate hardware and/or software or any combination thereof. It is clear for a skilled person that, based on the description, existence and division of different units or functions of the source device 110 and/or the destination device 120 shown in FIG. 1 may vary depending on an actual device and application.

The structure of the foregoing audio encoding and decoding system is merely an example for description. In some embodiments, the audio encoding and decoding system may further include another device. For example, the audio encoding and decoding system may further include a user side device or a cloud side device. After acquiring the original audio, the source device 110 preprocesses the original audio to obtain a three-dimensional audio signal; and transmits the three-dimensional audio to the user side device or the cloud side device, so that the user side device or the cloud side device implements functions of encoding and decoding the three-dimensional audio signal.

Figure 3:
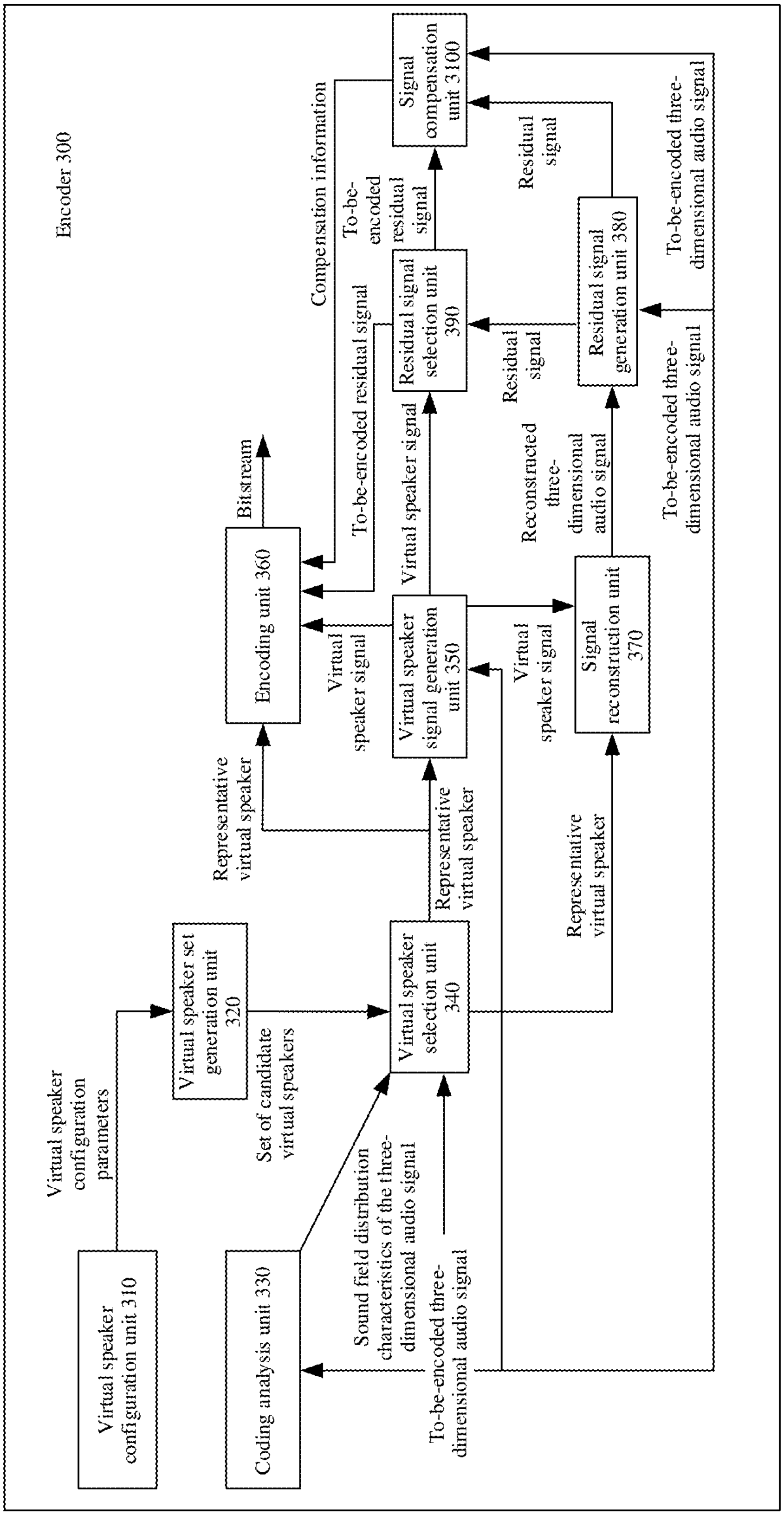
FIG. 3 is a schematic diagram of a structure of an encoder according to an embodiment of this application.

A method for encoding and decoding an audio signal provided in embodiments of this application is mainly applied to an encoder side. A structure of an encoder (for example, an encoder 300) is described in detail with reference to FIG. 3. As shown in FIG. 3, the encoder 300 includes a virtual speaker configuration unit 310, a virtual speaker set generation unit 320, a coding analysis unit 330, a virtual speaker selection unit 340, a virtual speaker signal generation unit 350, and an encoding unit 360.

The virtual speaker configuration unit 310 is configured to generate virtual speaker configuration parameters based on encoder configuration information, to obtain a plurality of virtual speakers. The encoder configuration information includes but is not limited to: an order (or usually referred to as an HOA order) of a three-dimensional audio signal, a coding bit rate, user-defined information, and the like. The virtual speaker configuration parameters include but are not limited to: a quantity of virtual speakers, an order of the virtual speaker, position coordinates of the virtual speaker, and the like. The quantity of virtual speakers is, for example, 2048, 1669, 1343, 1024, 530, 512, 256, 128, or 64. The order of the virtual speaker may be any one of 2 to 6. The position coordinates of the virtual speaker include an azimuth angle and an elevation angle.

The virtual speaker configuration parameters output by the virtual speaker configuration unit 310 are input into the virtual speaker set generation unit 320.

The virtual speaker set generation unit 320 is configured to generate a set of candidate virtual speakers based on the virtual speaker configuration parameters, where the set of candidate virtual speakers includes a plurality of virtual speakers. In an embodiment, the virtual speaker set generation unit 320 determines, based on the quantity of virtual speakers, the plurality of virtual speakers included in the set of candidate virtual speakers, and determines coefficients of the virtual speakers based on position information (for example, coordinates) of the virtual speakers and orders of the virtual speakers. For example, a method for determining coordinates of a virtual speaker includes but is not limited to: generating a plurality of virtual speakers according to an equidistant rule, or generating a plurality of virtual speakers that are not evenly distributed according to an auditory perception principle; and then generating coordinates of the virtual speakers based on a quantity of virtual speakers.

The coefficient of the virtual speaker may also be generated according to the foregoing principle of generating a three-dimensional audio signal. $\theta_s$ and $\varphi_s$ in formula (3) are set as position coordinates of the virtual speaker, and $B_{m,n}^{\sigma}$ represents a coefficient of an N-order virtual speaker. The coefficient of the virtual speaker may also be referred to as an ambisonics coefficient.

The coding analysis unit 330 is configured to perform coding analysis on a three-dimensional audio signal, for example, analyze sound field distribution characteristics of the three-dimensional audio signal, such as a quantity of sound sources of the three-dimensional audio signal, directivity of the sound source, and dispersion of the sound source.

The coefficients of the plurality of virtual speakers included in the set of candidate virtual speakers output by the virtual speaker set generation unit 320 are used as an input of the virtual speaker selection unit 340.

The sound field distribution characteristics of the three-dimensional audio signal output by the coding analysis unit 330 are used as an input of the virtual speaker selection unit 340.

The virtual speaker selection unit 340 is configured to determine, based on the to-be-encoded three-dimensional audio signal, the sound field distribution characteristics of the three-dimensional audio signal, and the coefficients of the plurality of virtual speakers, a representative virtual speaker that matches the three-dimensional audio signal.

The following is not limited: The encoder 300 in this embodiment of this application may not include the coding analysis unit 330, that is, the encoder 300 may not analyze an input signal, and the virtual speaker selection unit 340 determines, by using a default configuration, the representative virtual speaker. For example, the virtual speaker selection unit 340 determines the representative virtual speaker that matches the three-dimensional audio signal based on only the three-dimensional audio signal and the coefficients of the plurality of virtual speakers.

The encoder 300 may use, as an input of the encoder 300, the three-dimensional audio signal obtained from an acquisition device or a three-dimensional audio signal synthesized using an artificial audio object. In addition, the three-dimensional audio signal input by the encoder 300 may be a time-domain three-dimensional audio signal or a frequency-domain three-dimensional audio signal, which is not limited.

Position information of the representative virtual speaker and a coefficient of the representative virtual speaker that are output by the virtual speaker selection unit 340 are used as inputs of the virtual speaker signal generation unit 350 and the encoding unit 360.

The virtual speaker signal generation unit 350 is configured to generate a virtual speaker signal based on the three-dimensional audio signal and attribute information of the representative virtual speaker. The attribute information of the representative virtual speaker includes at least one of the position information of the representative virtual speaker, the coefficient of the representative virtual speaker, and a coefficient of the three-dimensional audio signal. If the attribute information is the position information of the representative virtual speaker, the coefficient of the representative virtual speaker is determined based on the position information of the representative virtual speaker. If the attribute information includes the coefficient of the three-dimensional audio signal, the coefficient of the representative virtual speaker is obtained based on the coefficient of the three-dimensional audio signal. In an embodiment, the virtual speaker signal generation unit 350 calculates the virtual speaker signal based on the coefficient of the three-dimensional audio signal and the coefficient of the representative virtual speaker.

For example, it is assumed that a matrix A shows coefficients of the virtual speakers and a matrix X shows coefficients of HOA signals. The matrix X is an inverse matrix of the matrix A. A theoretically optimal solution W is obtained by using a least square method, and W represents the virtual speaker signal. The virtual speaker signal satisfies formula (5).

$$w = A^{-1}X \quad \text{formula (5), where}$$

$A^{-1}$ represents the inverse matrix of the matrix A. A size of the matrix A is (M×C), where C represents a quantity of representative virtual speakers, M represents a quantity of sound channels of an N-order HOA signal, and a represents the coefficient of the representative virtual speaker. A size of the matrix X is (M×L), where L represents a quantity of coefficients of HOA signals, and x represents the coefficient of the HOA signal. The coefficient of the representative virtual speaker may be an HOA coefficient of the representative virtual speaker or an ambisonics coefficient of the representative virtual speaker. For example, $$A = \begin{bmatrix} a_{11} & \cdots & a_{1C} \\ \vdots & \ddots & \vdots \\ a_{M1} & \cdots & a_{MC} \end{bmatrix}, \text{ and } X = \begin{bmatrix} x_{11} & \cdots & x_{1L} \\ \vdots & \ddots & \vdots \\ x_{M1} & \cdots & x_{ML} \end{bmatrix}.$$

The virtual speaker signal output by the virtual speaker signal generation unit 350 is used as an input of the encoding unit 360.

In an embodiment, to improve quality of a reconstructed three-dimensional audio signal at a decoder side, the encoder 300 may further pre-estimate a reconstructed three-dimensional audio signal, generate a residual signal by using the pre-estimated reconstructed three-dimensional audio signal, and compensate the virtual speaker signal by using the residual signal. This improves accuracy of the virtual speaker signal at the encoder side representing sound field information of a sound source of the three-dimensional audio signal. For example, the encoder 300 may further include a signal reconstruction unit 370 and a residual signal generation unit 380.

The signal reconstruction unit 370 is configured to pre-estimate a reconstructed three-dimensional audio signal based on the position information of the representative virtual speaker and the coefficient of the representative virtual speaker that are output by the virtual speaker selection unit 340, and the virtual speaker signal output by the virtual speaker signal generation unit 350, to obtain the reconstructed three-dimensional audio signal. The reconstructed three-dimensional audio signal output by the signal reconstruction unit 370 is used as an input of the residual signal generation unit 380.

The residual signal generation unit 380 is configured to generate a residual signal based on the reconstructed three-dimensional audio signal and the to-be-encoded three-dimensional audio signal. The residual signal may represent a difference between the original three-dimensional audio signal and the reconstructed three-dimensional audio signal obtained based on the virtual speaker signal. The residual signal output by the residual signal generation unit 380 is used as an input of a residual signal selection unit 390 and an input of a signal compensation unit 3100.

The encoding unit 360 may encode the virtual speaker signal and the residual signal to obtain a bitstream. To improve coding efficiency of the encoder 300, a part of the residual signal may be selected for the encoding unit 360 to perform encoding. In an embodiment, the encoder 300 may further include the residual signal selection unit 390 and the signal compensation unit 3100.

The residual signal selection unit 390 is configured to determine a to-be-encoded residual signal based on the virtual speaker signal and the residual signal. For example, the residual signal includes $(N+1)^2$ coefficients. The residual signal selection unit 390 may select, from the $(N+1)^2$ coefficients, fewer than $(N+1)^2$ coefficients as the to-be-encoded residual signal. The to-be-encoded residual signal output by the residual signal selection unit 390 is used as an input of the encoding unit 360 and an input of the signal compensation unit 3100.

Because the residual signal selection unit 390 selects coefficients whose quantity is less than a quantity of N-order ambisonics coefficients, as the to-be-transmitted residual signal, information loss may occur compared with a case in which N-order ambisonics coefficients are selected as the residual signal. Therefore, the signal compensation unit 3100 performs information compensation on a residual signal that is not transmitted. The signal compensation unit 3100 is configured to determine compensation information based on the to-be-encoded three-dimensional audio signal, the residual signal, and the to-be-encoded residual signal. The compensation information is used to indicate related information of the to-be-encoded residual signal and the residual signal that is not transmitted. For example, the compensation information is used to indicate a difference between the to-be-encoded residual signal and the residual signal that is not transmitted, so that the decoder side performs decoding accurately.

The encoding unit 360 is configured to perform core encoding processing on the virtual speaker signal, the to-be-encoded residual signal, and the compensation information to obtain a bitstream. Core encoding processing includes but is not limited to: transform, quantization, psychoacoustic-model-based processing, noise shaping, bandwidth expansion, down-mixing, arithmetic encoding, bitstream generation, and the like.

It should be noted that the spatial encoder 1131 may include the virtual speaker configuration unit 310, the virtual speaker set generation unit 320, the coding analysis unit 330, the virtual speaker selection unit 340, and the virtual speaker signal generation unit 350. In other words, the virtual speaker configuration unit 310, the virtual speaker set generation unit 320, the coding analysis unit 330, the virtual speaker selection unit 340, the virtual speaker signal generation unit 350, the signal reconstruction unit 370, the residual signal generation unit 380, the residual signal selection unit 390, and the signal compensation unit 3100 implement the functions of the spatial encoder 1131. The core encoder 1132 may include the encoding unit 360. In other words, the encoding unit 360 implements the function of the core encoder 1132.

The encoder shown in FIG. 3 may generate one virtual speaker signal, or may generate a plurality of virtual speaker signals. The plurality of virtual speaker signals may be obtained by the encoder shown in FIG. 3 through a plurality of separate operations, or may be obtained by the encoder shown in FIG. 3 at a time.

Figure 4:
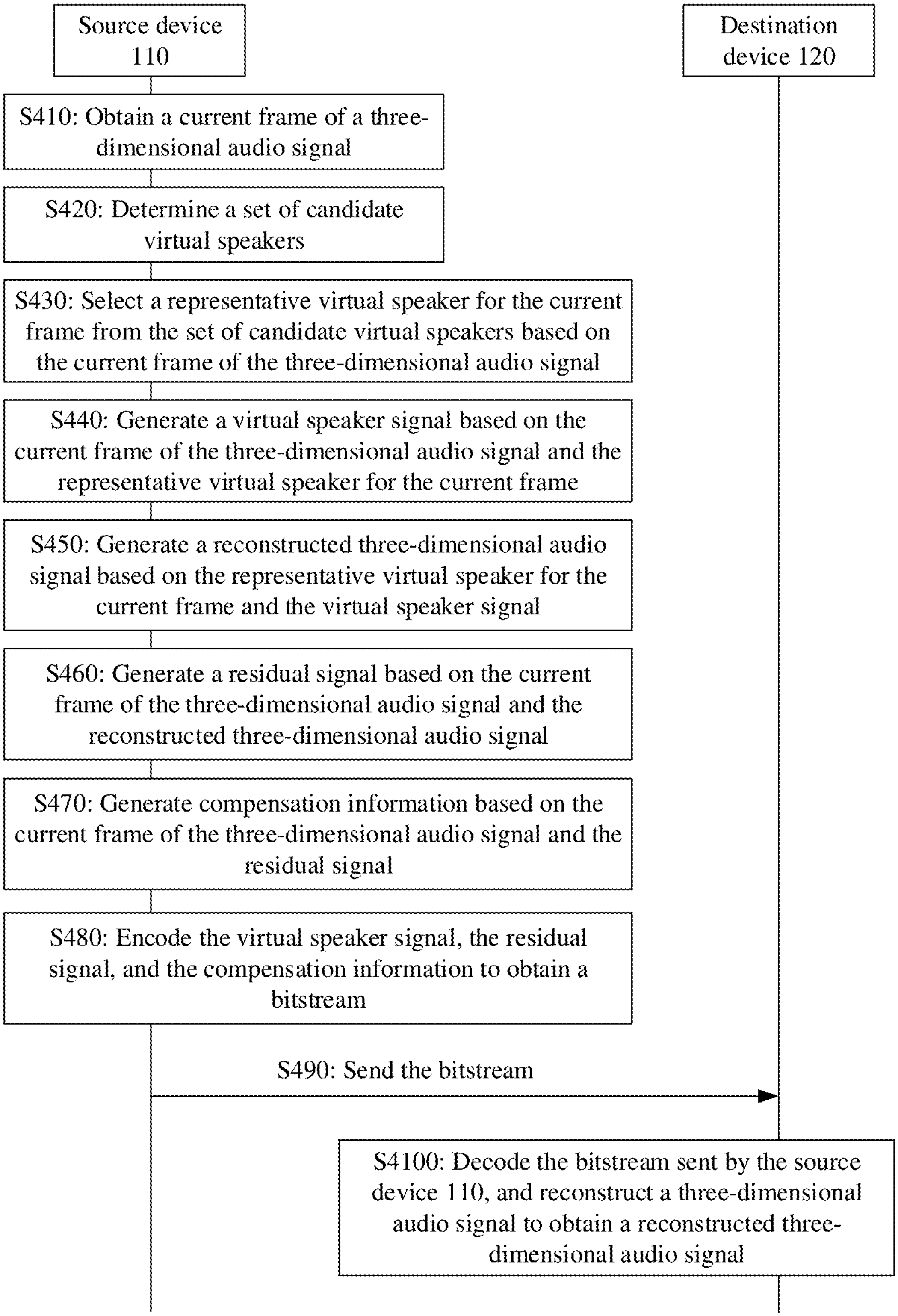
FIG. 4 is a schematic flowchart of a method for encoding and decoding a three-dimensional audio signal according to an embodiment of this application.

The following describes a process of encoding and decoding a three-dimensional audio signal with reference to the accompanying drawing. FIG. 4 is a schematic flowchart of a method for encoding and decoding a three-dimensional audio signal according to an embodiment of this application. Herein, an example in which the source device 110 and the destination device 120 in FIG. 1 perform the process of encoding and decoding a three-dimensional audio signal is used for description. As shown in FIG. 4, the method includes the following operations:

S410: The source device 110 obtains a current frame of a three-dimensional audio signal.

As described in the foregoing embodiment, if the source device 110 carries the audio obtainer 111, the source device 110 may obtain original audio through the audio obtainer 111. In an embodiment, the source device 110 may alternatively receive the original audio acquired by another device, or obtain the original audio from a memory in the source device 110 or another memory. The original audio may include at least one of a sound of the real world acquired in real time, audio stored in a device, and audio synthesized from a plurality of pieces of audio. A manner of obtaining the original audio and a type of the original audio are not limited in this embodiment.

After obtaining the original audio, the source device 110 generates a three-dimensional audio signal based on a three-dimensional audio technology and the original audio, so that the destination device 120 plays back a reconstructed three-dimensional audio signal. In other words, when the destination device 120 plays back a sound generated by the reconstructed three-dimensional audio signal, a "being there" sound effect is provided for a listener. For a specific method for generating a three-dimensional audio signal, refer to the descriptions of the preprocessor 112 in the foregoing embodiment and descriptions in a conventional technology.

In addition, the audio signal is a continuous analog signal. In an audio signal processing process, an audio signal may be first sampled to generate a digital signal in a frame sequence. The frame may include a plurality of sampling points. The frame may alternatively be sampling points obtained through sampling. The frame may include subframes obtained by dividing the frame. The frame may alternatively mean subframes obtained by dividing the frame. For example, if a length of a frame is L sampling points and the frame is divided into N subframes, each subframe corresponds to L/N sampling points. Audio encoding and decoding generally mean processing an audio frame sequence including a plurality of sampling points.

The audio frame may include a current frame or a previous frame. The current frame or the previous frame described in this embodiment of this application may be a frame or a subframe. The current frame is a frame on which encoding and decoding processing is performed at a current moment. The previous frame is a frame on which encoding and decoding processing has been performed at a moment before the current moment. The previous frame may be a frame at a previous moment of the current moment or frames at previous moments of the current moment. In this embodiment of this application, the current frame of the three-dimensional audio signal is a frame of three-dimensional audio signal on which encoding and decoding processing is performed at the current moment. The previous frame is a frame of three-dimensional audio signal on which encoding and decoding processing has been performed before the current moment. The current frame of the three-dimensional audio signal may be a to-be-encoded current frame of the three-dimensional audio signal. The current frame of the three-dimensional audio signal may be referred to as a current frame for short. The previous frame of the three-dimensional audio signal may be referred to as a previous frame for short.

S420: The source device 110 determines a set of candidate virtual speakers.

In a case, a set of candidate virtual speakers is preconfigured in a memory of the source device 110. The source device 110 may read the set of candidate virtual speakers from the memory. The set of candidate virtual speakers includes a plurality of virtual speakers. A virtual speaker means a speaker that virtually exists in a spatial sound field. The virtual speaker is configured to calculate a virtual speaker signal based on the three-dimensional audio signal, so that the destination device 120 plays back a reconstructed three-dimensional audio signal, that is, the destination device 120 plays back a sound generated by the reconstructed three-dimensional audio signal.

In another case, virtual speaker configuration parameters are configured in advance in the memory of the source device 110. The source device 110 generates the set of candidate virtual speakers based on the virtual speaker configuration parameters. In an embodiment, the source device 110 generates the set of candidate virtual speakers in real time based on a computing resource (for example, a processor) capability of the source device 110 and characteristics (for example, a channel and an amount of data) of the current frame.

For a specific method for generating a set of candidate virtual speakers, refer to the conventional technology and the descriptions of the virtual speaker configuration unit 310 and the virtual speaker set generation unit 320 in the foregoing embodiment.

S430: The source device 110 selects a representative virtual speaker for the current frame from the set of candidate virtual speakers based on the current frame of the three-dimensional audio signal.

The source device 110 may select the representative virtual speaker for the current frame from the set of candidate virtual speakers according to a matched-projection (MP) method.

The source device 110 may further vote on the virtual speakers based on a coefficient of the current frame and coefficients of the virtual speakers, and select the representative virtual speaker for the current frame from the set of candidate virtual speakers based on votes for the virtual speakers. The set of candidate virtual speakers is searched for a limited quantity of representative virtual speakers for the current frame as best matching virtual speakers for the to-be-encoded current frame, to perform data compression on the to-be-encoded three-dimensional audio signal.

It should be noted that the representative virtual speaker for the current frame belongs to the set of candidate virtual speakers. A quantity of representative virtual speakers for the current frame is less than or equal to a quantity of virtual speakers included in the set of candidate virtual speakers.

S440: The source device 110 generates the virtual speaker signal based on the current frame of the three-dimensional audio signal and the representative virtual speaker for the current frame.

The source device 110 generates the virtual speaker signal based on the coefficient of the current frame and a coefficient of the representative virtual speaker for the current frame. For a specific method for generating a virtual speaker signal, refer to the conventional technology and the descriptions of the virtual speaker signal generation unit 350 in the foregoing embodiment.

S450: The source device 110 generates a reconstructed three-dimensional audio signal based on the representative virtual speaker for the current frame and the virtual speaker signal.

The source device 110 generates the reconstructed three-dimensional audio signal based on the coefficient of the representative virtual speaker for the current frame and a coefficient of the virtual speaker signal. For a specific method for generating a reconstructed three-dimensional audio signal, refer to the conventional technology and the descriptions of the signal reconstruction unit 370 in the foregoing embodiment.

S460: The source device 110 generates a residual signal based on the current frame of the three-dimensional audio signal and the reconstructed three-dimensional audio signal.

S470: The source device 110 generates compensation information based on the current frame of the three-dimensional audio signal and the residual signal.

For a specific method for generating a residual signal and compensation information, refer to the conventional technology and the descriptions of the residual signal generation unit 380 and the signal compensation unit 3100 in the foregoing embodiment.

S480: The source device 110 encodes the virtual speaker signal, the residual signal, and the compensation information to obtain a bitstream.

The source device 110 may perform an encoding operation such as transform or quantization on the virtual speaker signal, the residual signal, and the compensation information to generate a bitstream, to perform data compression on the to-be-encoded three-dimensional audio signal. For a specific method for generating a bitstream, refer to the conventional technology and the descriptions of the encoding unit 360 in the foregoing embodiment.

S490: The source device 110 sends the bitstream to the destination device 120.

The source device 110 may send the bitstream of the original audio to the destination device 120 after encoding all the original audio. Alternatively, the source device 110 may alternatively encode the three-dimensional audio signal in real time by frames, to be specific, send a bitstream of a frame after encoding the frame. For a specific method for sending a bitstream, refer to the conventional technology and the descriptions of the communication interface 114 and the communication interface 124 in the foregoing embodiment.

S4100: The destination device 120 decodes the bitstream sent by the source device 110, and reconstructs a three-dimensional audio signal to obtain a reconstructed three-dimensional audio signal.

After receiving the bitstream, the destination device 120 decodes the bitstream to obtain the virtual speaker signal, and then reconstructs the three-dimensional audio signal based on the set of candidate virtual speakers and the virtual speaker signal, to obtain the reconstructed three-dimensional audio signal. The destination device 120 plays back the reconstructed three-dimensional audio signal, that is, the destination device 120 plays back a sound generated by the reconstructed three-dimensional audio signal. Alternatively, the destination device 120 transmits the reconstructed three-dimensional audio signal to another playback device, and the another playback device plays the reconstructed three-dimensional audio signal, that is, the another playback device plays the sound generated by the reconstructed three-dimensional audio signal. This creates a realistic sound effect of "being there" in a place such as a cinema, a concert hall, or a virtual scene for the listener.

Currently, in a process of searching for a virtual speaker, an encoder uses a result of related calculation between the to-be-encoded three-dimensional audio signal and the virtual speaker as a criterion for selecting a virtual speaker. If the encoder transmits one virtual speaker for each coefficient, data compression cannot be implemented, and a heavy calculation burden is caused to the encoder. However, if the virtual speaker used by the encoder to encode different frames of the three-dimensional audio signal is subject to large fluctuation, a reconstructed three-dimensional audio signal consequently has low quality, and a sound played at a decoder side has poor sound quality. Therefore, this embodiment of this application provides a method for selecting a virtual speaker. After obtaining an initial virtual speaker for the current frame, the encoder determines coding efficiency of the initial virtual speaker, and determines, based on a capability, indicated by the coding efficiency, of the initial virtual speaker to reconstruct a sound field to which the three-dimensional audio signal belongs, whether to reselect a virtual speaker for the current frame. When the coding efficiency of the initial virtual speaker for the current frame meets a preset condition, that is, in a scenario in which the initial virtual speaker for the current frame cannot fully represent a sound field to which a reconstructed three-dimensional audio signal belongs, the virtual speaker for the current frame is reselected, and an updated virtual speaker for the current frame is used as a virtual speaker for encoding the current frame. Therefore, the reselection of a virtual speaker reduces fluctuation of the virtual speaker used for encoding different frames of the three-dimensional audio signal, and thus improves quality of a reconstructed three-dimensional audio signal at the decoder side, and improves sound quality of a sound played at the decoder side.

In this embodiment of this application, the coding efficiency may also be referred to as sound field reconstruction efficiency, three-dimensional audio signal reconstruction efficiency, or virtual speaker selection efficiency.

Figure 5:
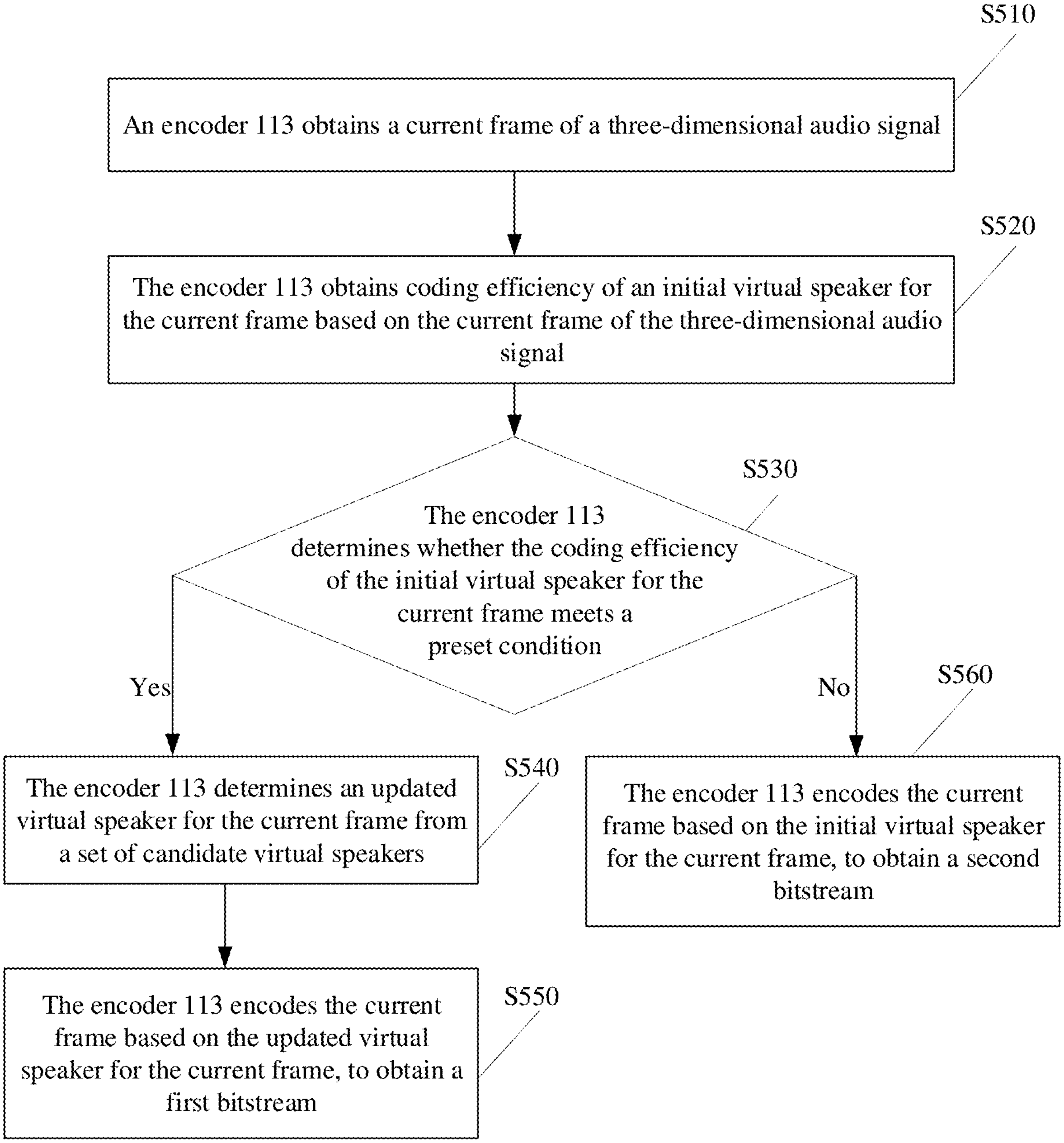
FIG. 5 is a schematic flowchart of a method for encoding a three-dimensional audio signal according to an embodiment of this application.

A process of selecting a virtual speaker is described in detail below with reference to the accompanying drawing. FIG. 5 is a schematic flowchart of a method for encoding a three-dimensional audio signal according to an embodiment of this application. Herein, an example in which the encoder 113 in the source device 110 in FIG. 1 performs the process of selecting a virtual speaker is used for description. As shown in FIG. 5, the method includes the following operations:

S510: The encoder 113 obtains a current frame of a three-dimensional audio signal.

The encoder 113 may obtain a current frame of a three-dimensional audio signal that is obtained after the preprocessor 112 processes original audio acquired by the audio obtainer 111. For related explanations of the current frame of the three-dimensional audio signal, refer to the descriptions in S410.

S520: The encoder 113 obtains coding efficiency of an initial virtual speaker for the current frame based on the current frame of the three-dimensional audio signal.

The encoder 113 selects the initial virtual speaker for the current frame from a set of candidate virtual speakers based on the current frame of the three-dimensional audio signal. The initial virtual speaker for the current frame belongs to the set of candidate virtual speakers. A quantity of initial virtual speakers for the current frame is less than or equal to a quantity of virtual speakers included in the set of candidate virtual speakers. For a specific method for obtaining an initial virtual speaker, refer to the foregoing S420 and S430, and the following description of obtaining a representative virtual speaker in FIG. 11.

The coding efficiency of the initial virtual speaker for the current frame represents a capability of the initial virtual speaker for the current frame to reconstruct a sound field to which the three-dimensional audio signal belongs. It may be understood that, if the initial virtual speaker for the current frame fully expresses sound field information of the three-dimensional audio signal, the capability of the initial virtual speaker for the current frame to reconstruct the sound field to which the three-dimensional audio signal belongs is strong. If the initial virtual speaker for the current frame cannot fully express the sound field information of the three-dimensional audio signal, the capability of the initial virtual speaker for the current frame to reconstruct the sound field to which the three-dimensional audio signal belongs is weak.

The following describes a method in which the encoder 113 obtains the coding efficiency of the initial virtual speaker for the current frame.

In a first possible implementation, after determining the coding efficiency of the initial virtual speaker for the current frame based on energy of a reconstructed current frame and energy of the current frame, the encoder 113 performs S530. The encoder 113 first determines a virtual speaker signal of the current frame based on the current frame of the three-dimensional audio signal and the initial virtual speaker for the current frame, and determines a reconstructed current frame of a reconstructed three-dimensional audio signal based on the initial virtual speaker for the current frame and the virtual speaker signal. It should be noted that the reconstructed current frame of the reconstructed three-dimensional audio signal herein is a reconstructed three-dimensional audio signal pre-estimated by the encoder side, but not a reconstructed three-dimensional audio signal reconstructed by a decoder side. In an embodiment, for a specific method for generating a virtual speaker signal of the current frame and a reconstructed current frame of the reconstructed three-dimensional audio signal, refer to the descriptions in S440 and S450. The coding efficiency of the initial virtual speaker for the current frame may satisfy the following formula (6):

$$R' = \frac{NRG_1}{NRG_2}, \quad \text{formula (6)}$$

where

R' represents the coding efficiency of the initial virtual speaker for the current frame, $NRG_1$ represents energy of the reconstructed current frame, and $NRG_2$ represents energy of the current frame.

In some embodiments, the energy of the reconstructed current frame is determined based on a coefficient of the reconstructed current frame, and the energy of the current frame is determined based on a coefficient of the current frame. For example, the encoder 113 may calculate representative values R1, R2, to Rt of energy of all channels of the reconstructed current frame. Rt=norm(SRt), where norm( ) represents a 2-norm operation, and SRt represents a modified discrete cosine transform (MDCT) coefficient included in a $t^{th}$ channel of the reconstructed current frame. If the three-dimensional audio signal is an HOA signal, a value of t ranges from 1 to a square of (an order of the HOA signal+1).

The encoder 113 may calculate representative values N1, N2, to Nt of the energy of the current frame. Nt=norm(SNt), where SNt represents the MDCT coefficient included in the $t^{th}$ channel of the current frame.

Therefore, the coding efficiency of the initial virtual speaker for the current frame is R'=sum(R)/sum(N), where sum(R) represents a sum of R1 to Rt, $NRG_1$ is equal to sum(R), sum(N) represents a sum of N1 to Nt, and $NRG_2$ is equal to sum(N).

In a second possible implementation, after determining the coding efficiency of the initial virtual speaker for the current frame based on a ratio of energy of a virtual speaker signal of the current frame to a sum of the energy of the virtual speaker signal of the current frame and energy of a residual signal, the encoder 113 performs S530. The sum of the energy of the virtual speaker signal of the current frame and the energy of the residual signal may represent energy of a transmitted signal. The encoder 113 first determines the virtual speaker signal of the current frame based on the current frame of the three-dimensional audio signal and the initial virtual speaker for the current frame, determines the reconstructed current frame of the reconstructed three-dimensional audio signal based on the initial virtual speaker for the current frame and the virtual speaker signal, and obtains a residual signal of the current frame based on the current frame and the reconstructed current frame. In an embodiment, for a specific method for generating a residual signal, refer to the descriptions in S460. The coding efficiency of the initial virtual speaker for the current frame may satisfy the following formula (7):

$$R' = \frac{NRG_3}{NRG_3 + NRG_4}, \quad \text{formula (7)}$$

where

R' represents the coding efficiency of the initial virtual speaker for the current frame, $NRG_3$ represents energy of the virtual speaker signal of the current frame, and $NRG_4$ represents energy of the residual signal.

In a third possible implementation, after determining the coding efficiency of the initial virtual speaker for the current frame based on a ratio of a quantity of the initial virtual speakers for the current frame to a quantity of the sound sources, the encoder 113 performs S530. The encoder 113 may determine the quantity of sound sources based on the current frame of the three-dimensional audio signal. In an embodiment, for a specific method for determining a quantity of sound sources of the three-dimensional audio signal, refer to the descriptions of the coding analysis unit 330. The coding efficiency of the initial virtual speaker for the current frame may satisfy the following formula (8):

$$R' = \frac{N_1}{N_2}, \quad \text{formula (8)}$$

where

R' represents the coding efficiency of the initial virtual speaker for the current frame, $N_1$ represents the quantity of initial virtual speakers for the current frame, and $N_2$ represents the quantity of sound sources of the three-dimensional audio signal. The quantity of sound sources may be, for example, preset based on an actual scenario. The quantity of sound sources may be an integer greater than or equal to 1.

In a fourth possible implementation, after determining the coding efficiency of the initial virtual speaker for the current frame based on the ratio of a quantity of virtual speaker signals of the current frame to the quantity of sound sources of the three-dimensional audio signal, the encoder 113 performs S530. The coding efficiency of the initial virtual speaker for the current frame may satisfy the following formula (9):

$$R' = \frac{N_3}{N_2}, \quad \text{formula (9)}$$

where

R' represents the coding efficiency of the initial virtual speaker for the current frame, $N_3$ represents the quantity of virtual speaker signals of the current frame, and $N_2$ represents the quantity of sound sources of the three-dimensional audio signal.

S530: The encoder 113 determines whether the coding efficiency of the initial virtual speaker for the current frame meets a preset condition.

If the coding efficiency of the initial virtual speaker for the current frame meets the preset condition, it indicates that the initial virtual speaker for the current frame cannot fully express the sound field information of the three-dimensional audio signal, and the capability of the initial virtual speaker for the current frame to reconstruct the sound field to which the three-dimensional audio signal belongs is weak. In this case, the encoder 113 performs S540 and S550.

If the coding efficiency of the initial virtual speaker for the current frame does not meet the preset condition, it indicates that the initial virtual speaker for the current frame fully expresses the sound field information of the three-dimensional audio signal, and the capability of the initial virtual speaker for the current frame to reconstruct the sound field to which the three-dimensional audio signal belongs is strong. In this case, the encoder 113 performs S560.

For example, the preset condition includes that the coding efficiency of the initial virtual speaker for the current frame is less than a first threshold. The encoder 113 may determine whether the coding efficiency of the initial virtual speaker for the current frame is less than the first threshold.

It should be noted that, for the foregoing four different embodiments, value ranges of the first threshold may be different.

For example, the value range of the first threshold may be 0.5 to 1 in the first possible implementation. It may be understood that, if the coding efficiency is less than 0.5, it indicates that the energy of the reconstructed current frame is less than half of the energy of the current frame, which indicates that the initial virtual speaker for the current frame cannot fully express the sound field information of the three-dimensional audio signal, and the capability of the initial virtual speaker for the current frame to reconstruct the sound field to which the three-dimensional audio signal belongs is weak.

For another example, the value range of the first threshold may be 0.5 to 1 in the second possible implementation. It may be understood that, if the coding efficiency is less than 0.5, it indicates that the energy of the virtual speaker signal of the current frame is less than half of the energy of the transmitted signal, which indicates that the initial virtual speaker for the current frame cannot fully express the sound field information of the three-dimensional audio signal, and the capability of the initial virtual speaker for the current frame to reconstruct the sound field to which the three-dimensional audio signal belongs is weak.

For another example, the value range of the first threshold may be 0 to 1 in the third possible implementation. It may be understood that, if the coding efficiency is less than 1, it indicates that the quantity of initial virtual speakers for the current frame is less than the quantity of sound sources of the three-dimensional audio signal, which indicates that the initial virtual speaker for the current frame cannot fully express the sound field information of the three-dimensional audio signal, and the capability of the initial virtual speaker for the current frame to reconstruct the sound field to which the three-dimensional audio signal belongs is weak. For example, the quantity of initial virtual speakers for the current frame may be 2, and the quantity of sound sources of the three-dimensional audio signal may be 4. The quantity of initial virtual speakers for the current frame is half of the quantity of sound sources, indicating that the initial virtual speaker for the current frame cannot fully express the sound field information of the three-dimensional audio signal, and the capability of the initial virtual speaker for the current frame to reconstruct the sound field to which the three-dimensional audio signal belongs is weak.

For another example, the value range of the first threshold may be 0 to 1 in the fourth possible implementation. It may be understood that, if the coding efficiency is less than 1, it indicates that the quantity of virtual speaker signals of the current frame is less than the quantity of sound sources of the three-dimensional audio signal, which indicates that the initial virtual speaker for the current frame cannot fully express the sound field information of the three-dimensional audio signal, and the capability of the initial virtual speaker for the current frame to reconstruct the sound field to which the three-dimensional audio signal belongs is weak. For example, the quantity of virtual speaker signals of the current frame may be 2, and the quantity of sound sources of the three-dimensional audio signal may be 4. The quantity of virtual speaker signals of the current frame is half of the quantity of sound sources, indicating that the initial virtual speaker for the current frame cannot fully express the sound field information of the three-dimensional audio signal, and the capability of the initial virtual speaker for the current frame to reconstruct the sound field to which the three-dimensional audio signal belongs is weak.

In some embodiments, the first threshold may be a specific value. For example, the first threshold is 0.65.

It may be understood that a larger first threshold indicates a stricter preset condition, a higher probability that the encoder 113 reselects a virtual speaker, higher complexity of selecting a virtual speaker for the current frame, and smaller fluctuation of the virtual speaker used for encoding different frames of the three-dimensional audio signal. On the contrary, a smaller first threshold indicates a looser preset condition, a lower probability that the encoder 113 reselects a virtual speaker, lower complexity of selecting a virtual speaker for the current frame, and greater fluctuation of the virtual speaker used for encoding different frames of the three-dimensional audio signal. The first threshold may be set based on an actual application scenario, and a specific value of the first threshold is not limited in this embodiment.

S540: The encoder 113 determines an updated virtual speaker for the current frame from the set of candidate virtual speakers.

Figure 6:
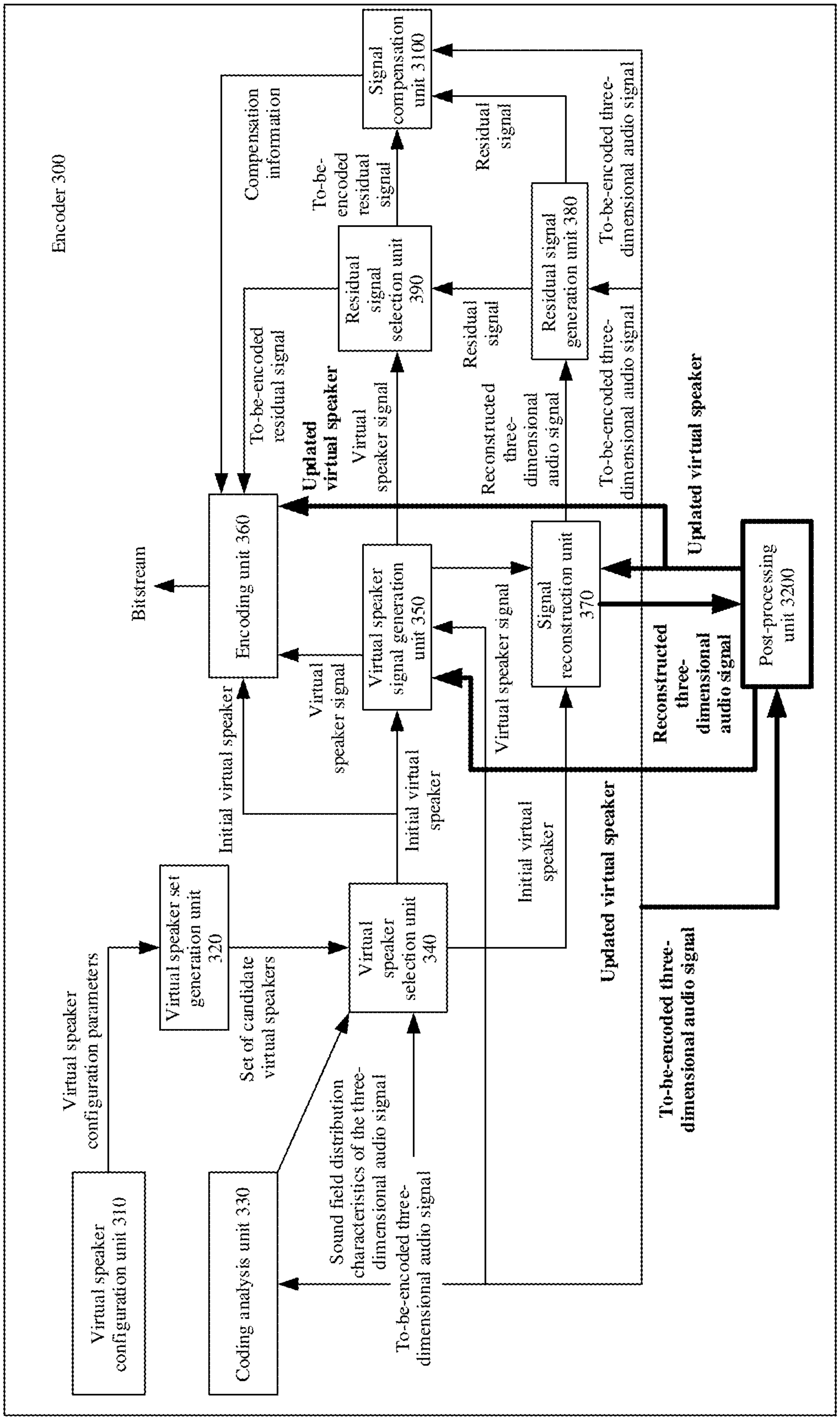
FIG. 6 is a schematic diagram of a structure of another encoder according to an embodiment of this application.

In a possible example, as shown in FIG. 6, a difference between FIG. 6 and FIG. 3 lies in that the encoder 300 further includes a post-processing unit 3200. The post-processing unit 3200 is connected to each of the virtual speaker signal generation unit 350 and the signal reconstruction unit 370. After obtaining the reconstructed current frame of the reconstructed three-dimensional audio signal from the signal reconstruction unit 370, the post-processing unit 3200 may determine the coding efficiency of the initial virtual speaker for the current frame based on the energy of the reconstructed current frame and the energy of the current frame. If the post-processing unit 3200 determines that the coding efficiency of the initial virtual speaker for the current frame meets the preset condition, the post-processing unit 3200 determines the updated virtual speaker for the current frame from the set of candidate virtual speakers. Further, the post-processing unit 3200 feeds back the updated virtual speaker for the current frame to the signal reconstruction unit 370, the virtual speaker signal generation unit 350, and the encoding unit 360. The virtual speaker signal generation unit 350 generates the virtual speaker signal based on the current frame and the updated virtual speaker for the current frame. The signal reconstruction unit 370 generates the reconstructed three-dimensional audio signal based on the updated virtual speaker for the current frame and an updated virtual speaker signal. In this way, input and output of each of the residual signal generation unit 380, the residual signal selection unit 390, the signal compensation unit 3100, and the encoding unit 360 are information (for example, the reconstructed three-dimensional audio signal and the virtual speaker signal), related to the updated virtual speaker for the current frame, which is different from information generated based on the initial virtual speaker for the current frame. It may be understood that, after the post-processing unit 3200 obtains the updated virtual speaker for the current frame, the encoder 113 performs operations S440 to S480 based on the updated virtual speaker.

Figure 7:
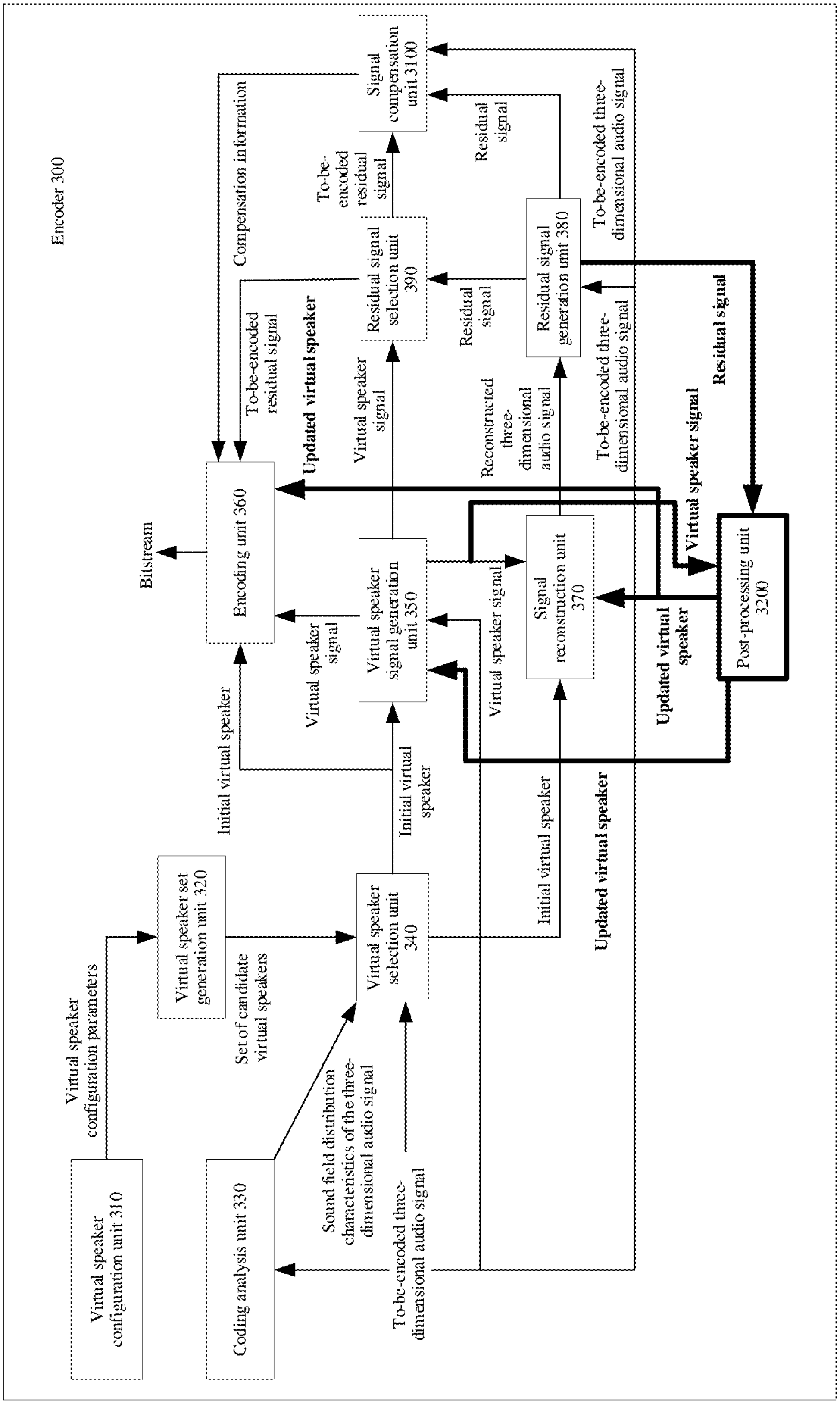
FIG. 7 is a schematic diagram of a structure of another encoder according to an embodiment of this application.

As shown in FIG. 7, a difference between FIG. 7 and FIG. 3 lies in that the encoder 300 further includes a post-processing unit 3200. The post-processing unit 3200 is connected to each of the virtual speaker signal generation unit 350 and the residual signal generation unit 380. After obtaining the virtual speaker signal of the current frame from the virtual speaker signal generation unit 350 and obtaining the residual signal from the residual signal generation unit 380, the post-processing unit 3200 may determine the coding efficiency of the initial virtual speaker for the current frame based on the ratio of the energy of the virtual speaker signal of the current frame to the sum of the energy of the virtual speaker signal of the current frame and the energy of the residual signal. If the post-processing unit 3200 determines that the coding efficiency of the initial virtual speaker for the current frame meets the preset condition, the post-processing unit 3200 determines the updated virtual speaker for the current frame from the set of candidate virtual speakers.

Figure 8:
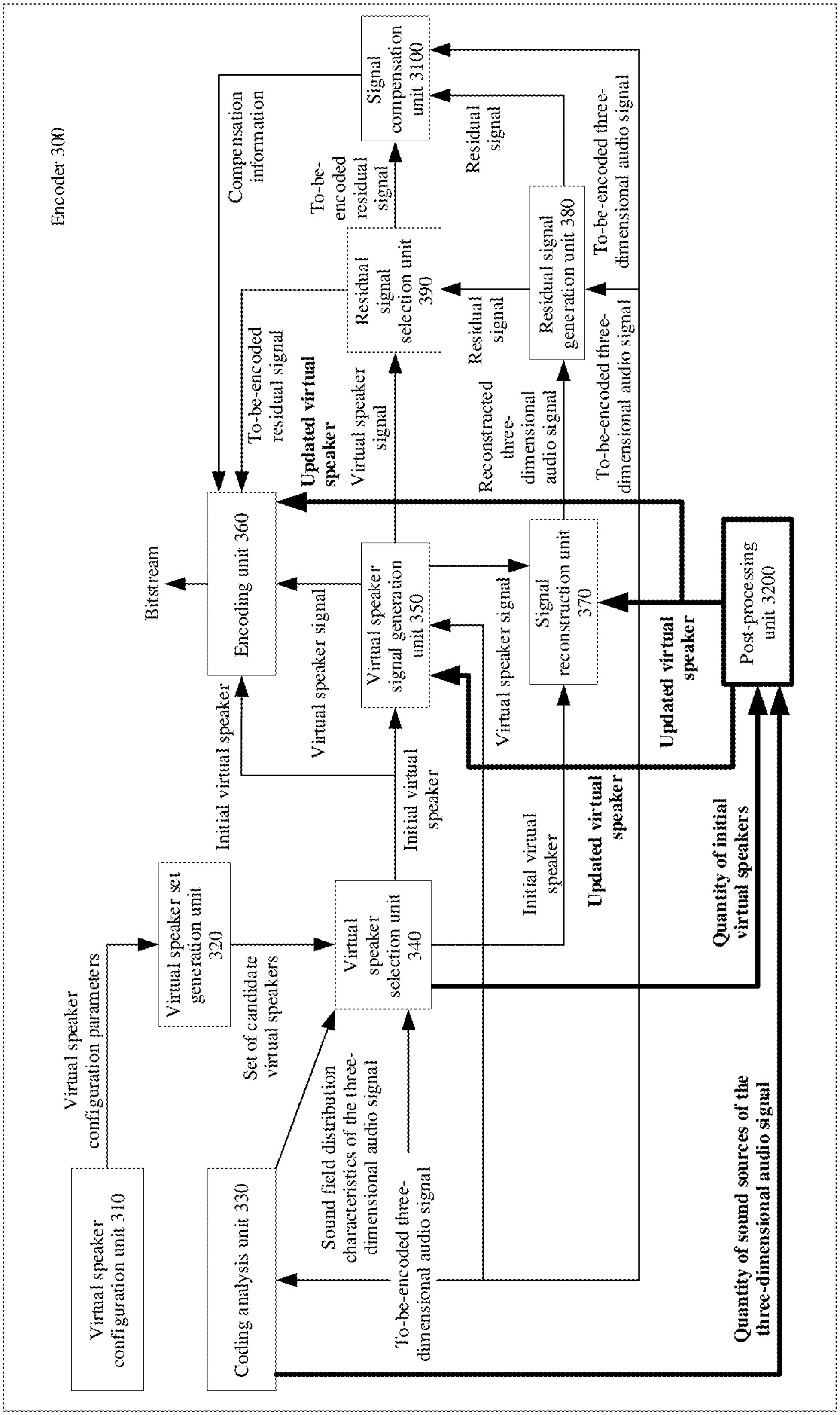
FIG. 8 is a schematic diagram of a structure of another encoder according to an embodiment of this application.

As shown in FIG. 8, a difference between FIG. 8 and FIG. 3 lies in that the encoder 300 further includes a post-processing unit 3200. The post-processing unit 3200 is connected to each of the coding analysis unit 330 and the virtual speaker selection unit 340. After obtaining the quantity of sound sources of the three-dimensional audio signal from the coding analysis unit 330, and obtaining the quantity of initial virtual speakers for the current frame from the virtual speaker selection unit 340, the post-processing unit 3200 determines the coding efficiency of the initial virtual speaker for the current frame based on the ratio of the quantity of initial virtual speakers for the current frame to the quantity of sound sources of the three-dimensional audio signal. If the post-processing unit 3200 determines that the coding efficiency of the initial virtual speaker for the current frame meets the preset condition, the post-processing unit 3200 determines the updated virtual speaker for the current frame from the set of candidate virtual speakers. The quantity of initial virtual speakers for the current frame may be preset or obtained through analysis by the virtual speaker selection unit 340.

Figure 9:
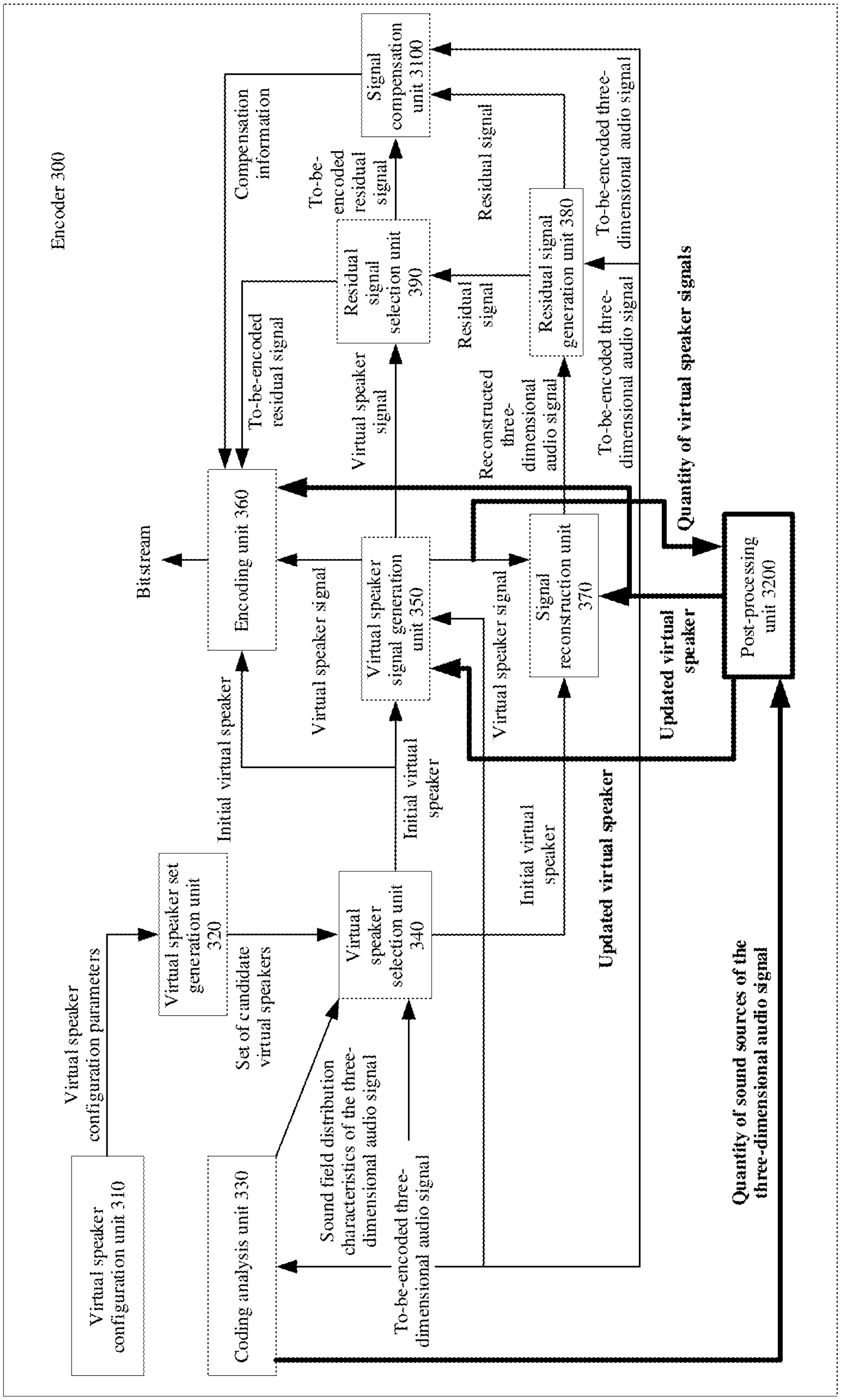
FIG. 9 is a schematic diagram of a structure of another encoder according to an embodiment of this application.

As shown in FIG. 9, a difference between FIG. 9 and FIG. 3 lies in that the encoder 300 further includes a post-processing unit 3200. The post-processing unit 3200 is connected to each of the coding analysis unit 330 and the virtual speaker signal generation unit 350. After obtaining the quantity of sound sources of the three-dimensional audio signal from the coding analysis unit 330, and obtaining the quantity of virtual speaker signals of the current frame from the virtual speaker signal generation unit 350, the post-processing unit 3200 determines the coding efficiency of the initial virtual speaker for the current frame based on the ratio of the quantity of virtual speaker signals of the current frame to the quantity of sound sources of the three-dimensional audio signal. If the post-processing unit 3200 determines that the coding efficiency of the initial virtual speaker for the current frame meets the preset condition, the post-processing unit 3200 determines the updated virtual speaker for the current frame from the set of candidate virtual speakers. The quantity of virtual speaker signals of the current frame may be preset or obtained through analysis by the virtual speaker selection unit 340.

If the coding efficiency of the initial virtual speaker for the current frame meets the preset condition, the encoder 113 may further determine the coding efficiency based on a second threshold less than the first threshold, so that the encoder 113 reselects a virtual speaker for the current frame accurately.

Figure 10:
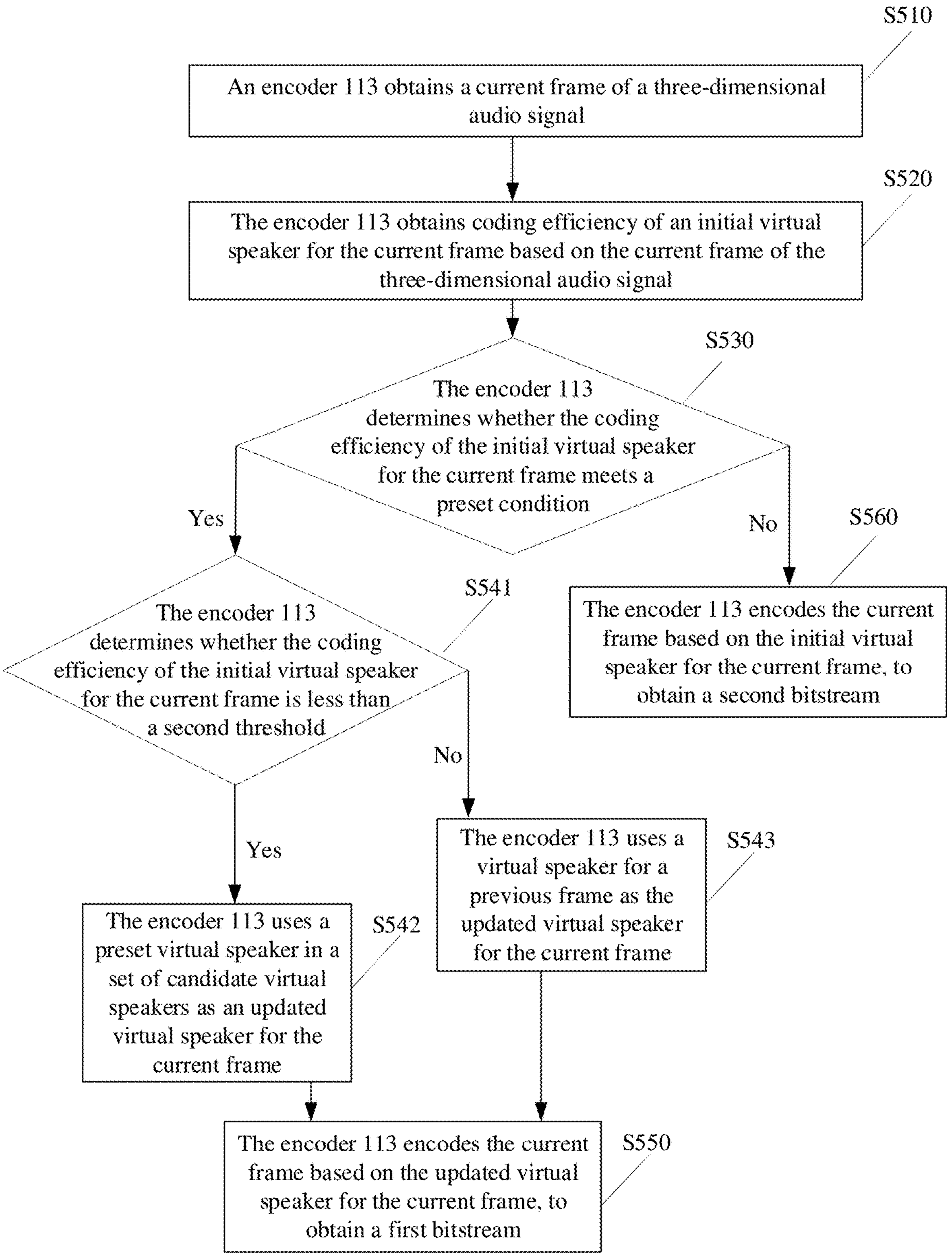
FIG. 10 is a schematic flowchart of another method for encoding a three-dimensional audio signal according to an embodiment of this application.

For example, as shown in FIG. 10, a method procedure in FIG. 10 is a description of a specific operation process included in S540 in FIG. 5.

S541: The encoder 113 determines whether the coding efficiency of the initial virtual speaker for the current frame is less than the second threshold.

If the coding efficiency of the initial virtual speaker for the current frame is less than or equal to the second threshold, S542 is performed; or if the coding efficiency of the initial virtual speaker for the current frame is greater than the second threshold and less than the first threshold, S543 is performed.

S542: The encoder 113 uses a preset virtual speaker in the set of candidate virtual speakers as the updated virtual speaker for the current frame.

The preset virtual speaker may be a specified virtual speaker. The specified virtual speaker may be any virtual speaker in the set of virtual speakers. For example, an azimuth angle of the specified virtual speaker is 100 degrees, and an elevation angle is 50 degrees.

The preset virtual speaker may be a virtual speaker in a standard speaker layout or a virtual speaker in a non-standard speaker layout. A standard speaker may be a speaker that is configured according to a 22.2 sound channel, a 7.1.4 sound channel, a 5.1.4 sound channel, a 7.1 sound channel, a 5.1 sound channel, or the like. The non-standard speaker may be a speaker that is disposed in advance based on an actual scenario.

The preset virtual speaker may alternatively be a virtual speaker determined based on a position of a sound source in a sound field. The position of the sound source may be obtained from the coding analysis unit 330, or obtained from the to-be-encoded three-dimensional audio signal.

S543: The encoder 113 uses a virtual speaker for a previous frame as the updated virtual speaker for the current frame.

The virtual speaker for the previous frame is a virtual speaker used for encoding the previous frame of the three-dimensional audio signal.

It should be noted that the encoder 113 uses the updated virtual speaker for the current frame as a representative virtual speaker for the current frame to encode the current frame.

In an embodiment, if the coding efficiency of the initial virtual speaker for the current frame is greater than the second threshold and less than the first threshold, the encoder 113 may further determine an adjusted coding efficiency of the initial virtual speaker for the current frame based on the coding efficiency of the initial virtual speaker for the current frame and coding efficiency of the virtual speaker for the previous frame. For example, the encoder 113 may generate the adjusted coding efficiency of the initial virtual speaker for the current frame based on the coding efficiency of the initial virtual speaker for the current frame and average coding efficiency of the virtual speaker for the previous frame. The adjusted coding efficiency satisfies formula (10).

$$R' = \frac{(R' + MR)}{2}, \qquad \text{formula (10)}$$

where

R' represents the coding efficiency of the initial virtual speaker for the current frame, MR' represents the adjusted coding efficiency, and MR represents the average coding efficiency of the virtual speaker for the previous frame. The previous frame may refer to one or more frames before the current frame.

If the coding efficiency of the initial virtual speaker for the current frame is greater than the adjusted coding efficiency of the initial virtual speaker for the current frame, it indicates that the initial virtual speaker for the current frame can fully express sound field information of the three-dimensional audio signal compared with the virtual speaker for the previous frame. Therefore, the encoder 113 uses the initial virtual speaker for the current frame as a virtual speaker for a subsequent frame of the current frame. This further reduces fluctuation of the virtual speaker used for encoding different frames of the three-dimensional audio signal, and thus improves quality of the reconstructed three-dimensional audio signal at the decoder side, and improves sound quality of a sound played at the decoder side.

If the coding efficiency of the initial virtual speaker for the current frame is less than the adjusted coding efficiency of the initial virtual speaker for the current frame, it indicates that the initial virtual speaker for the current frame cannot fully express the sound field information of the three-dimensional audio signal compared with the virtual speaker for the previous frame. In this case, the virtual speaker for the previous frame may be used as the virtual speaker for a subsequent frame of the current frame.

It should be noted that the second threshold may be a specific value. The second threshold is less than the first threshold. For example, the second threshold is 0.55. Specific values of the first threshold and the second threshold are not limited in this embodiment.

In an embodiment, in a scenario in which the coding efficiency of the initial virtual speaker for the current frame meets the preset condition, the encoder 113 may adjust the first threshold based on a preset granularity. For example, the preset granularity may be 0.1. For example, the first threshold is 0.65, the second threshold is 0.55, and a third threshold is 0.45. If the coding efficiency of the initial virtual speaker for the current frame is less than or equal to the second threshold, the encoder 113 may determine whether the coding efficiency of the initial virtual speaker for the current frame is less than the third threshold.

S550: The encoder 113 encodes the current frame based on the updated virtual speaker for the current frame, to obtain a first bitstream.

The encoder 113 generates an updated virtual speaker signal based on the current frame and the updated virtual speaker for the current frame, generates an updated reconstructed three-dimensional audio signal based on the updated virtual speaker for the current frame and the updated virtual speaker signal of the current frame, determines an updated residual signal based on an updated reconstructed current frame and the current frame, and determines the first bitstream based on the current frame and the updated residual signal. The encoder 113 may generate the first bitstream according to the descriptions of S430 to S480. In other words, the encoder 113 updates the initial virtual speaker for the current frame, and performs encoding by using the updated virtual speaker for the current frame, the updated residual signal, and updated compensation information, to obtain the first bitstream.

S560: The encoder 113 encodes the current frame based on the initial virtual speaker for the current frame, to obtain a second bitstream.

The encoder 113 may generate the second bitstream according to the descriptions of S430 to S480. In other words, the encoder 113 does not need to update the initial virtual speaker for the current frame, and performs encoding by using the initial virtual speaker for the current frame, the residual signal, and the compensation information, to obtain the second bitstream.

In this way, in a scenario in which the initial virtual speaker for the current frame cannot fully represent the sound field to which the reconstructed three-dimensional audio signal belongs, and consequently, quality of the reconstructed three-dimensional audio signal at the decoder side is poor, the encoder may determine, based on the capability, indicated by the coding efficiency of the initial virtual speaker, of the initial virtual speaker to reconstruct the sound field to which the three-dimensional audio signal belongs, to reselect a virtual speaker for the current frame. Then, the encoder uses the updated virtual speaker for the current frame as a virtual speaker for encoding the current frame. Therefore, by reselecting a virtual speaker, the encoder reduces fluctuation of the virtual speaker used for encoding different frames of the three-dimensional audio signal, and thus improves quality of the reconstructed three-dimensional audio signal at the decoder side, and improves sound quality of a sound played at the decoder side.

In some other embodiments, the source device 110 votes on the virtual speakers based on the coefficient of the current frame and coefficients of the virtual speakers, and selects the representative virtual speaker for the current frame from the set of candidate virtual speakers based on votes for the virtual speakers, to perform data compression on the to-be-encoded three-dimensional audio signal. In this embodiment, the representative virtual speaker for the current frame may be used as the initial virtual speaker in the foregoing embodiments.

Figure 11:
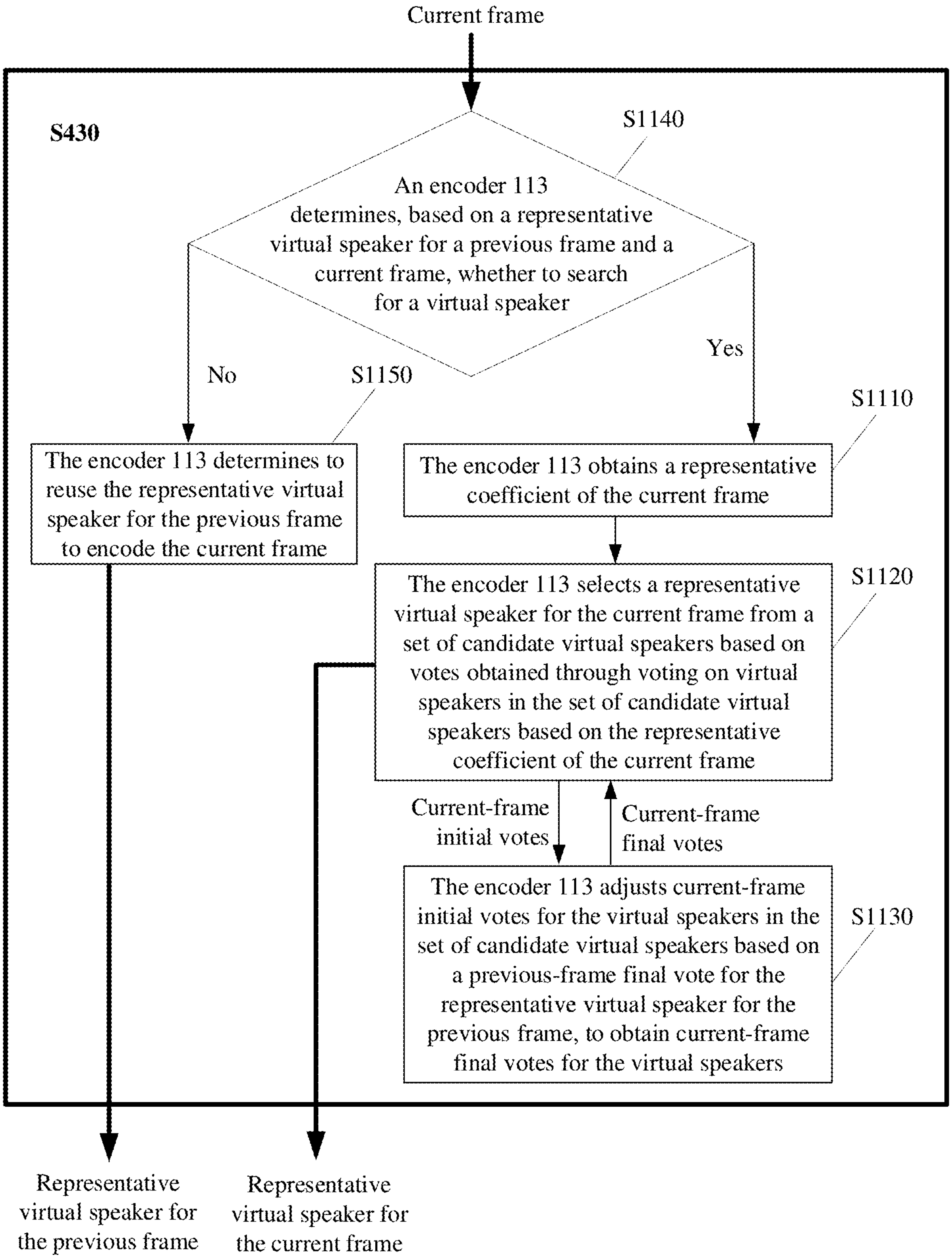
FIG. 11 is a schematic flowchart of a method for selecting a virtual speaker according to an embodiment of this application.

FIG. 11 is a schematic flowchart of a method for selecting a virtual speaker according to an embodiment of this application. A method procedure in FIG. 11 is a description of a specific operation process included in S430 in FIG. 4. Herein, an example in which the encoder 113 in the source device 110 in FIG. 1 performs the process of selecting a virtual speaker is used for description. In an embodiment, a function of the virtual speaker selection unit 340 is implemented. As shown in FIG. 11, the method includes the following operations:

S1110: The encoder 113 obtains a representative coefficient of a current frame.

The representative coefficient may be a frequency domain representative coefficient or a time domain representative coefficient. The frequency domain representative coefficient may also be referred to as a frequency domain representative frequency or a spectrum representative coefficient. The time domain representative coefficient may also be referred to as a time domain representative sampling point.

For example, after obtaining a fourth quantity of coefficients of a current frame of a three-dimensional audio signal and frequency domain eigenvalues of the fourth quantity of coefficients, the encoder 113 selects a third quantity of representative coefficients from the fourth quantity of coefficients based on the frequency domain eigenvalues of the fourth quantity of coefficients, and then selects a second quantity of representative virtual speakers for the current frame from a set of candidate virtual speakers based on the third quantity of representative coefficients. The fourth quantity of coefficients includes the third quantity of representative coefficients, and the third quantity is less than the fourth quantity, indicating that the third quantity of representative coefficients are some coefficients in the fourth quantity of coefficients. The current frame of the three-dimensional audio signal is an HOA signal, and a frequency domain eigenvalue of the coefficient is determined based on a coefficient of the HOA signal.

In this way, the encoder selects some coefficients from all coefficients of the current frame as representative coefficients, and uses a small quantity of representative coefficients, in place of all the coefficients of the current frame, to select the representative virtual speaker from the set of candidate virtual speakers. Therefore, calculation complexity of searching for the virtual speaker by the encoder is effectively reduced, thereby reducing calculation complexity of performing compression coding on the three-dimensional audio signal and reducing a calculation burden of the encoder.

S1120: The encoder 113 selects the representative virtual speaker for the current frame from the set of candidate virtual speakers based on votes obtained through voting on the virtual speakers in the set of candidate virtual speakers based on the representative coefficient of the current frame.

The encoder 113 votes on the virtual speakers in the set of candidate virtual speakers based on the representative coefficient of the current frame and coefficients of the virtual speakers, and selects (searches for) the representative virtual speaker for the current frame from the set of candidate virtual speakers based on current-frame final votes for the virtual speakers.

For example, the encoder 113 determines a first quantity of virtual speakers and a first quantity of votes based on the third quantity of representative coefficients of the current frame, the set of candidate virtual speakers, and a quantity of voting rounds, and selects the second quantity of representative virtual speakers for the current frame from the first quantity of virtual speakers based on the first quantity of votes. The second quantity is less than the first quantity, indicating that the second quantity of representative virtual speakers for the current frame are some virtual speakers in the set of candidate virtual speakers. It may be understood that the virtual speakers are in a one-to-one correspondence with the votes. For example, the first quantity of virtual speakers include a first virtual speaker, the first quantity of votes include a vote for the first virtual speaker, and the first virtual speaker corresponds to the vote for the first virtual speaker. The vote for the first virtual speaker is used to represent a priority of using the first virtual speaker to encode the current frame. The set of candidate virtual speakers includes a fifth quantity of virtual speakers. The fifth quantity of virtual speakers includes the first quantity of virtual speakers. The first quantity is less than or equal to the fifth quantity. The quantity of voting rounds is an integer greater than or equal to 1, and the quantity of voting rounds is less than or equal to the fifth quantity.

Currently, in a process of searching for a virtual speaker, the encoder uses a result of related calculation between the to-be-encoded three-dimensional audio signal and the virtual speaker as a criterion for selecting a virtual speaker. In addition, if the encoder transmits one virtual speaker for each coefficient, efficient data compression cannot be implemented, and a heavy calculation burden is caused to the encoder. According to the method for selecting a virtual speaker provided in this embodiment of this application, the encoder uses a small quantity of representative coefficients, in replace of all the coefficients of the current frame, to vote on the virtual speakers in the set of candidate virtual speakers, and selects the representative virtual speaker for the current frame based on the votes. Further, the encoder uses the representative virtual speaker for the current frame to perform compression coding on the to-be-coded three-dimensional audio signal. This not only effectively improves a probability of performing compression coding on the three-dimensional audio signal, but also reduces calculation complexity of searching for the virtual speaker by the encoder, thereby reducing calculation complexity of performing compression coding on the three-dimensional audio signal and reducing a calculation burden of the encoder.

The second quantity is used to represent a quantity of representative virtual speakers for the current frame selected by the encoder. A larger value of the second quantity indicates a larger quantity of representative virtual speakers for the current frame, and more sound field information of the three-dimensional audio signal; and a smaller value of the second quantity indicates a smaller quantity of representative virtual speakers for the current frame, and less sound field information of the three-dimensional audio signal. Therefore, the quantity of representative virtual speakers for the current frame selected by the encoder may be controlled by setting the second quantity. For example, the second quantity may be preset. For another example, the second quantity may be determined based on the current frame. For example, a value of the second quantity may be 1, 2, 4, or 8.

It should be noted that the encoder first traverses the virtual speakers included in the set of candidate virtual speakers, and compresses the current frame by using the representative virtual speaker for the current frame selected from the set of candidate virtual speakers. However, if results brought by virtual speakers selected for consecutive frames differ greatly, a sound image of a reconstructed three-dimensional audio signal is unstable, and sound quality of the reconstructed three-dimensional audio signal is reduced. In this embodiment of this application, the encoder 113 may update, based on a previous-frame final vote for a representative virtual speaker for a previous frame, current-frame initial votes for the virtual speakers included in the set of candidate virtual speakers, to obtain current-frame final votes for the virtual speakers, and then select a representative virtual speaker for the current frame from the set of candidate virtual speakers based on the current-frame final votes for the virtual speakers. Therefore, the representative virtual speaker for the current frame is selected with reference to the representative virtual speaker for the previous frame, so that the encoder tends to select a virtual speaker that is the same as the representative virtual speaker for the previous frame when selecting, for the current frame, the representative virtual speaker for the current frame. This increases continuity of orientation between consecutive frames, and resolves the problem that results brought by virtual speakers selected for consecutive frames differ greatly. Therefore, this embodiment of this application may further include S1130.

S1130: The encoder 113 adjusts current-frame initial votes for the virtual speakers in the set of candidate virtual speakers based on the previous-frame final vote for a representative virtual speaker for a previous frame, to obtain current-frame final votes for the virtual speakers.

After voting on the virtual speakers in the set of candidate virtual speakers based on the representative coefficient of the current frame and coefficients of the virtual speakers, and obtaining the current-frame initial votes for the virtual speakers, the encoder 113 adjusts the current-frame initial votes for the virtual speakers in the set of candidate virtual speakers based on the previous-frame final vote for the representative virtual speaker for the previous frame, to obtain the current-frame final votes for the virtual speakers. The representative virtual speaker for the previous frame is a virtual speaker used by the encoder 113 to encode the previous frame.

The encoder 113 obtains, based on the first quantity of votes and a sixth quantity of previous-frame final votes, a seventh quantity of virtual speakers and a seventh quantity of current-frame final votes corresponding to the current frame; and selects, from the seventh quantity of virtual speakers based on the seventh quantity of current-frame final votes, a second quantity of representative virtual speakers for the current frame. The second quantity is less than the seventh quantity, indicating that the second quantity of representative virtual speakers for the current frame are some virtual speakers in the seventh quantity of the virtual speakers. The seventh quantity of virtual speakers includes the first quantity of virtual speakers, and the seventh quantity of virtual speakers includes a sixth quantity of virtual speakers. The sixth quantity of virtual speakers are representative virtual speakers for a previous frame of a three-dimensional audio signal that are used for encoding the previous frame. The sixth quantity of virtual speakers included in a set of representative virtual speakers for the previous frame are in a one-to-one correspondence with the sixth quantity of previous-frame final votes.

In a process of searching for a virtual speaker, because a position of a real sound source does not necessarily overlap a position of a virtual speaker, the virtual speaker may not necessarily form a one-to-one correspondence with the real sound source. In addition, in an actual complex scenario, a limited quantity of sets of virtual speakers may not represent all sound sources in a sound field. In this case, a virtual speaker found between frames may frequently jump. Such jump obviously affects hearing experience of a listener, and causes obvious discontinuity and noise in a reconstructed three-dimensional audio signal obtained through decoding. According to the method for selecting a virtual speaker provided in this embodiment of this application, the representative virtual speaker for a previous frame is inherited, that is, for virtual speakers with a same number, a current-frame initial vote is adjusted by using a previous-frame final vote, so that the encoder tends to select the representative virtual speaker for the previous frame. This reduces frequent jumps of the virtual speaker between frames, enhances continuity of signal orientation between frames, makes a sound image of a reconstructed three-dimensional audio signal more stable, and ensures sound quality of the reconstructed three-dimensional audio signal.

In some embodiments, if the current frame is a 1$^{st}$ frame of original audio, the encoder 113 performs S1110 and S1120. If the current frame is any frame later than a 2$^{nd}$ frame of the original audio, the encoder 113 may first determine whether to reuse the representative virtual speaker for the previous frame to encode the current frame, or determine whether to search for a virtual speaker, so as to ensure continuity of orientation between consecutive frames and reduce encoding complexity. This embodiment of this application may further include S1140.

S1140: The encoder 113 determines, based on the representative virtual speaker for the previous frame and the current frame, whether to search for a virtual speaker.

If the encoder 113 determines to search for a virtual speaker, the encoder 113 performs S1110 to S1130. In an embodiment, the encoder 113 may first perform S1110. To be specific, the encoder 113 obtains a representative coefficient of the current frame, and the encoder 113 determines, based on the representative coefficient of the current frame and a coefficient of the representative virtual speaker for the previous frame, whether to search for a virtual speaker. If the encoder 113 determines to search for a virtual speaker, the encoder 113 performs S1120 and S1130.

If the encoder 113 determines not to search for a virtual speaker, the encoder 113 performs S1150.

S1150: The encoder 113 determines to reuse the representative virtual speaker for the previous frame to encode the current frame.

The encoder 113 reuses the representative virtual speaker for the previous frame and the current frame to generate a virtual speaker signal, encodes the virtual speaker signal to obtain a bitstream, and sends the bitstream to the destination device 120.

In an embodiment, in the process of reselecting a virtual speaker provided in this embodiment of this application, it is assumed that an initial virtual speaker for the current frame is determined based on a vote for the representative virtual speaker for the previous frame, and coding efficiency of the initial virtual speaker for the current frame is less than the first threshold. In this case, the encoder 113 may clear the vote for the representative virtual speaker for the previous frame, to prevent the encoder 113 from selecting a representative virtual speaker for the previous frame that cannot fully express the sound field information of the three-dimensional audio signal, which causes low quality of a reconstructed three-dimensional audio signal, and poor sound quality of a sound played at a decoder side.

It may be understood that, to implement functions in the foregoing embodiment, the encoder includes corresponding hardware structures and/or software modules for performing the functions. A person skilled in the art should be easily aware that, in combination with the units and the method operations in the examples described in embodiments disclosed in this application, this application can be implemented by hardware or a combination of hardware and computer software. Whether a function is performed by hardware or hardware driven by computer software depends on particular application scenarios and design constraints of the technical solutions.

The foregoing describes in detail the method for encoding a three-dimensional audio signal provided in embodiments with reference to FIG. 1 to FIG. 11. The following describes an apparatus for encoding a three-dimensional audio signal and an encoder provided in embodiments with reference to FIG. 12 and FIG. 13.

Figure 12:
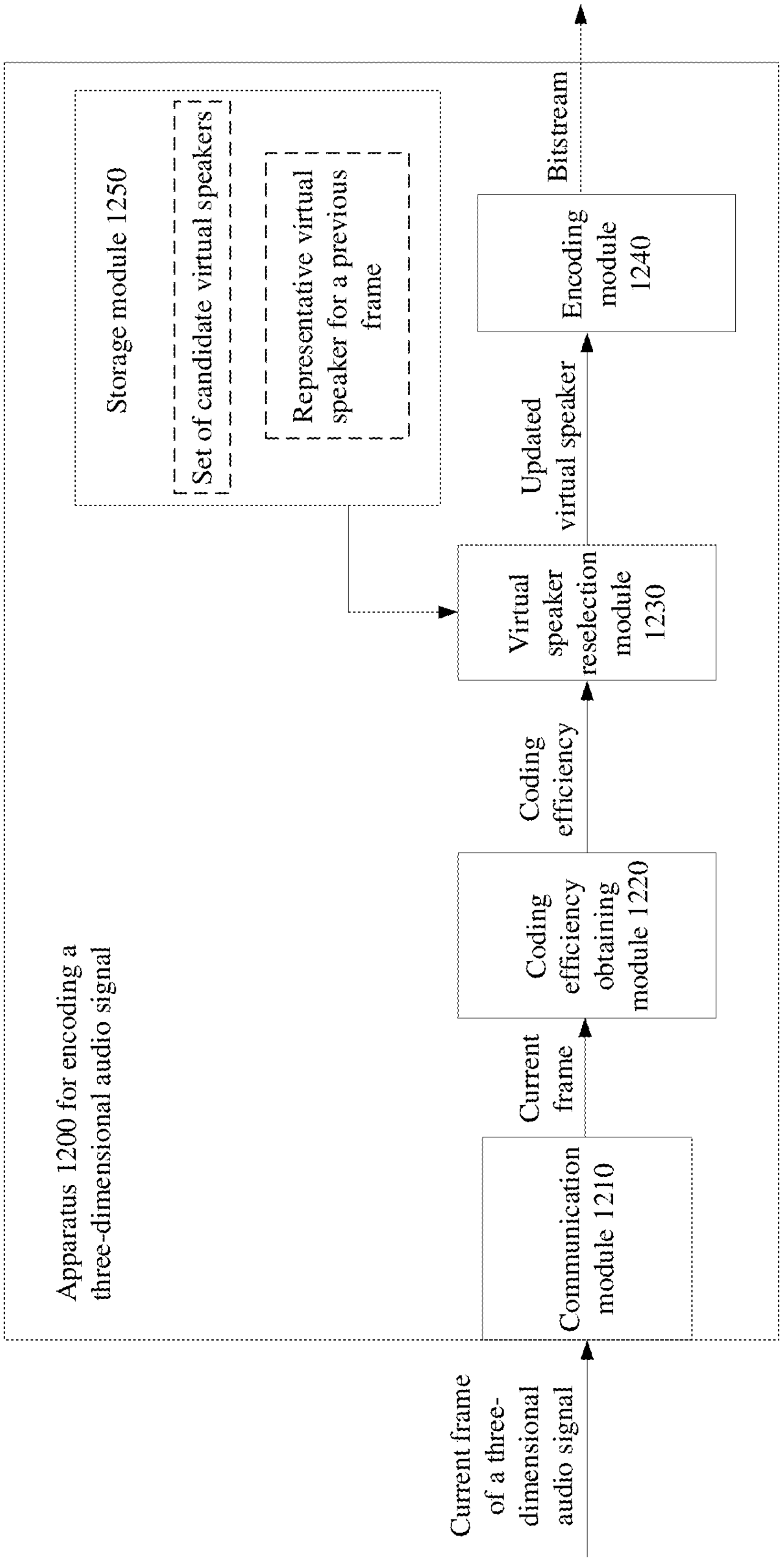
FIG. 12 is a schematic diagram of a structure of an apparatus for encoding a three-dimensional audio signal according to this application.

FIG. 12 is a schematic diagram of a possible structure of an apparatus for encoding a three-dimensional audio signal according to an embodiment. The apparatus for encoding a three-dimensional audio signal may be configured to implement the functions of encoding a three-dimensional audio signal in the foregoing method embodiments, and therefore can also implement the beneficial effects of the foregoing method embodiments. In this embodiment, the apparatus for encoding a three-dimensional audio signal may be the encoder 113 shown in FIG. 1, or the encoder 300 shown in FIG. 3, or may be a module (for example, a chip) applied to a terminal device or a server.

As shown in FIG. 12, the apparatus 1200 for encoding a three-dimensional audio signal includes a communication module 1210, a coding efficiency obtaining module 1220, a virtual speaker reselection module 1230, an encoding module 1240, and a storage module 1250. The apparatus 1200 for encoding a three-dimensional audio signal is configured to implement functions of the encoder 113 in the method embodiment shown in FIG. 5 and FIG. 10.

The communication module 1210 is configured to obtain a current frame of a three-dimensional audio signal. In an embodiment, the communication module 1210 may alternatively receive the current frame of the three-dimensional audio signal obtained by another device; or obtain the current frame of the three-dimensional audio signal from the storage module 1250. The three-dimensional audio signal is an HOA signal. A frequency domain eigenvalue of a coefficient is determined based on a two-dimensional vector. The two-dimensional vector includes an HOA coefficient of the HOA signal.

The coding efficiency obtaining module 1220 is configured to obtain coding efficiency of an initial virtual speaker for the current frame based on the current frame of the three-dimensional audio signal. The initial virtual speaker for the current frame belongs to a set of candidate virtual speakers. When the apparatus 1200 for encoding a three-dimensional audio signal is configured to implement the functions of the encoder 113 in the method embodiment shown in FIG. 5 and FIG. 10, the coding efficiency obtaining module 1220 is configured to implement a related function in S520.

The virtual speaker reselection module 1230 is configured to: if the coding efficiency of the initial virtual speaker for the current frame meets a preset condition, determine an updated virtual speaker for the current frame from the set of candidate virtual speakers. When the apparatus 1200 for encoding a three-dimensional audio signal is configured to implement the functions of the encoder 113 in the method embodiment shown in FIG. 5, the virtual speaker reselection module 1230 is configured to implement related functions in S530 and S540. When the apparatus 1200 for encoding a three-dimensional audio signal is configured to implement the functions of the encoder 113 in the method embodiment shown in FIG. 10, the virtual speaker reselection module 1230 is configured to implement related functions in S530, and S541 to S543.

If the coding efficiency of the initial virtual speaker for the current frame meets the preset condition, the encoding module 1240 is configured to encode the current frame based on the updated virtual speaker for the current frame, to obtain a first bitstream.

If the coding efficiency of the initial virtual speaker for the current frame does not meet the preset condition, the encoding module 1240 is configured to encode the current frame based on the initial virtual speaker for the current frame, to obtain a second bitstream.

When the apparatus 1200 for encoding a three-dimensional audio signal is configured to implement the functions of the encoder 113 in the method embodiment shown in FIG. 5 and FIG. 10, the encoding module 1240 is configured to implement related functions in S550 and S560.

The storage module 1250 is configured to store a coefficient related to the three-dimensional audio signal, the set of candidate virtual speakers, a set of representative virtual speakers for a previous frame, a bitstream, a selected coefficient and a selected virtual speaker, and the like, so that the encoding module 1240 encodes the current frame to obtain a bitstream, and transmits the bitstream to a decoder.

It should be understood that the apparatus 1200 for encoding a three-dimensional audio signal in this embodiment of this application may be implemented by using an application-specific integrated circuit (ASIC) or a programmable logic device (PLD). The PLD may be a complex programmable logical device (CPLD), a field-programmable gate array (FPGA), a generic array logic (GAL), or any combination thereof. When the method for encoding a three-dimensional audio signal shown in FIG. 5 and FIG. 10 may also be implemented by software, the apparatus 1200 for encoding a three-dimensional audio signal and the modules thereof may also be software modules.

For more detailed descriptions of the communication module 1210, the coding efficiency obtaining module 1220, the virtual speaker reselection module 1230, the encoding module 1240, and the storage module 1250, refer to the related descriptions in the method embodiment shown in FIG. 5 and FIG. 10. Details are not described herein again.

Figure 13:
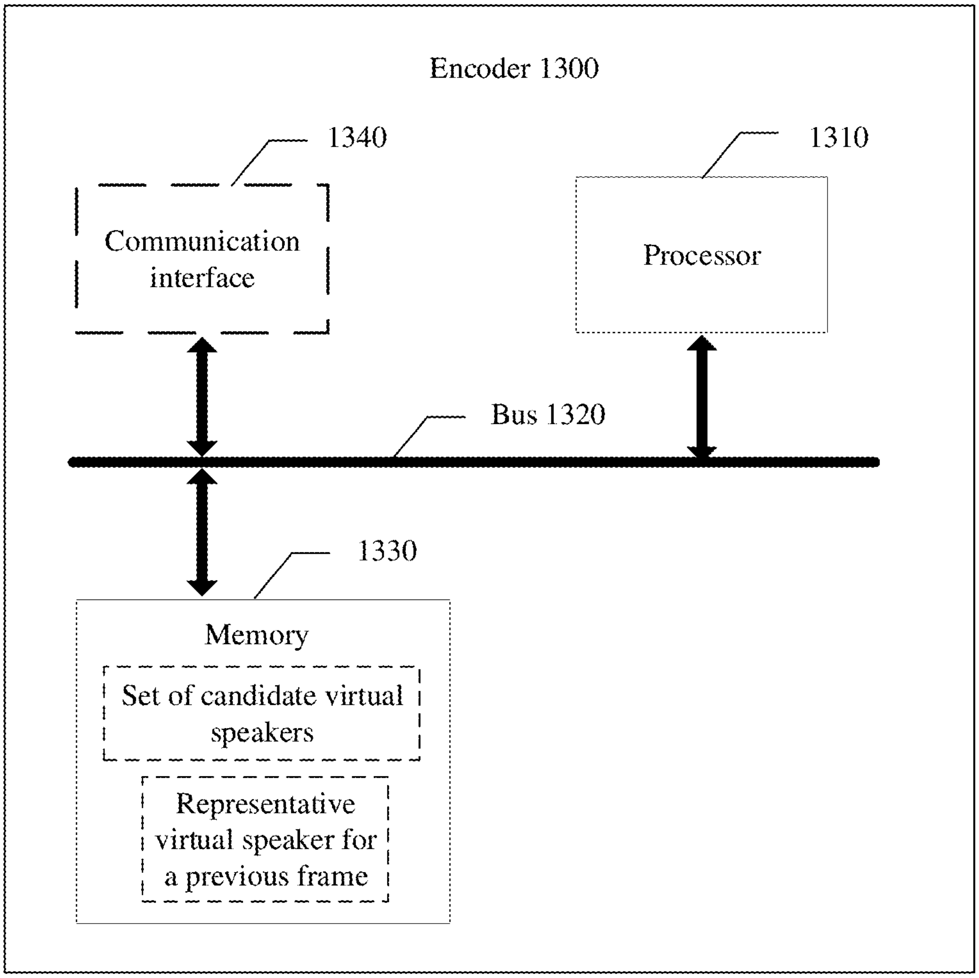
FIG. 13 is a schematic diagram of a structure of an encoder according to this application.

FIG. 13 is a schematic diagram of a structure of an encoder 1300 according to an embodiment. As shown in the figure, the encoder 1300 includes a processor 1310, a bus 1320, a memory 1330, and a communication interface 1340.

It should be understood that, in this embodiment, the processor 1310 may be a central processing unit (CPU), or the processor 1310 may be another general-purpose processor, a digital signal processor (DSP), an ASIC, an FPGA or another programmable logic device, a discrete gate or a transistor logic device, a discrete hardware component, or the like. The general-purpose processor may be a microprocessor or any conventional processor.

Alternatively, the processor may be a graphics processing unit (GPU), a neural network processor (NPU), a microprocessor, or one or more integrated circuits configured to control program execution in the solutions of this application.

The communication interface 1340 is configured to implement communication between the encoder 1300 and an external device or component. In this embodiment, the communication interface 1340 is configured to receive a three-dimensional audio signal.

The bus 1320 may include a path for transmitting information between the foregoing components (for example, the processor 1310 and the memory 1330). The bus 1320 may further include a power bus, a control bus, a status signal bus, and the like, in addition to a data bus. However, for clear description, various types of buses in the figure are marked as the bus 1320.

In an example, the encoder 1300 may include a plurality of processors. The processor may be a multi-core (multi-CPU) processor. The processor herein may be one or more devices, circuits, and/or computing units configured to process data (for example, computer program instructions). The processor 1310 may invoke a coefficient related to the three-dimensional audio signal stored in the memory 1330, a set of candidate virtual speakers, a set of representative virtual speakers for a previous frame, and a selected coefficient and a selected virtual speaker, and the like.

It should be noted that, the encoder 1300 including one processor 1310 and one memory 1330 is merely used as an example in FIG. 13. Herein, the processor 1310 and the memory 1330 each indicate a type of component or device. In a specific embodiment, a quantity of components or devices of each type may be determined based on a service requirement.

The memory 1330 may correspond to a storage medium, for example, a magnetic disk, such as a mechanical hard disk or a solid state disk, configured to store information such as the coefficient related to the three-dimensional audio signal, the set of candidate virtual speakers, the set of representative virtual speakers for the previous frame, and the selected coefficient and selected virtual speaker in the foregoing method embodiment.

The encoder 1300 may be a general-purpose device or a dedicated device. For example, the encoder 1300 may be an X86-based server or an ARM-based server, or may be another dedicated server such as a policy control and charging (PCC) server. A type of the encoder 1300 is not limited in this embodiment of this application.

It should be understood that the encoder 1300 according to this embodiment may correspond to the apparatus 1200 for encoding a three-dimensional audio signal in the embodiment, and may correspond to a corresponding entity performing any method in FIG. 5 and FIG. 10. In addition, the foregoing and other operations and/or functions of the modules in the apparatus 1200 for encoding a three-dimensional audio signal are respectively used to implement a corresponding procedure of each method in FIG. 5 and FIG. 10. For brevity, details are not described herein again.

An embodiment of this application further provides a system. The system includes a decoder and the encoder shown in FIG. 13. The encoder and the decoder are configured to implement the method operations shown in FIG. 5 and FIG. 10. For brevity, details are not described herein again.

The method operations in embodiments may be implemented by hardware, or may be implemented by a processor executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be disposed in an ASIC. In addition, the ASIC may be located in a network device or a terminal device. Certainly, the processor and the storage medium may alternatively exist as discrete components in a network device or a terminal device.

All or some of the foregoing embodiments may be implemented by software, hardware, firmware, or any combination thereof. When the solutions are implemented by software, all or some of the solutions may be implemented in a form of a computer program product. The computer program product includes one or more computer programs and instructions. When the computer programs or instructions are loaded and executed on a computer, all or some of the procedures or the functions in embodiments of this application are performed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid state drive (SSD).

The foregoing descriptions are merely specific implementations of this application, but the protection scope of this application is not limited thereto. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for encoding a three-dimensional audio signal, comprising:

obtaining a current frame of a three-dimensional audio signal;

obtaining coding efficiency of an initial virtual speaker for the current frame based on the current frame of the three-dimensional audio signal, wherein the initial virtual speaker for the current frame belongs to a set of candidate virtual speakers;

when the coding efficiency of the initial virtual speaker for the current frame meets a preset condition, determining an updated virtual speaker for the current frame from the set of candidate virtual speakers, and encoding the current frame based on the updated virtual speaker for the current frame, to obtain a first bitstream; and when the coding efficiency of the initial virtual speaker for the current frame does not meet the preset condition, encoding the current frame based on the initial virtual speaker for the current frame, to obtain a second bitstream;

wherein the preset condition comprises the coding efficiency of the initial virtual speaker for the current frame is less than a first threshold.

2. The method according to claim 1, wherein obtaining the coding efficiency of the initial virtual speaker for the current frame comprises:

obtaining a reconstructed current frame of a reconstructed three-dimensional audio signal based on the initial virtual speaker for the current frame; and determining the coding efficiency of the initial virtual speaker for the current frame based on energy of the reconstructed current frame and energy of the current frame.

3. The method according to claim 2, wherein the energy of the reconstructed current frame is determined based on a coefficient of the reconstructed current frame, and the energy of the current frame is determined based on a coefficient of the current frame.

4. The method according to claim 1, wherein obtaining the coding efficiency of the initial virtual speaker for the current frame comprises:

obtaining a reconstructed current frame of a reconstructed three-dimensional audio signal based on the initial virtual speaker for the current frame;

obtaining a residual signal of the current frame based on the current frame of the three-dimensional audio signal and the reconstructed current frame of the reconstructed three-dimensional audio signal;

obtaining an energy sum of energy of a virtual speaker signal of the current frame and energy of the residual signal; and determining the coding efficiency of the initial virtual speaker for the current frame based on a ratio of the energy of the virtual speaker signal of the current frame to the energy sum.

5. The method according to claim 2, wherein obtaining the reconstructed current frame of the reconstructed three-dimensional audio signal comprises:

determining a virtual speaker signal of the current frame based on the initial virtual speaker for the current frame; and determining the reconstructed current frame based on the virtual speaker signal of the current frame.

6. The method according to claim 1, wherein obtaining the coding efficiency of the initial virtual speaker for the current frame comprises:

determining a quantity of sound sources based on the current frame of the three-dimensional audio signal; and determining the coding efficiency of the initial virtual speaker for the current frame based on a quantity of initial virtual speakers for the current frame and the quantity of sound sources.

7. The method according to claim 1, wherein obtaining the coding efficiency of the initial virtual speaker for the current frame comprises:

determining a quantity of sound sources based on the current frame of the three-dimensional audio signal;

determining a virtual speaker signal of the current frame based on the initial virtual speaker for the current frame; and determining the coding efficiency of the initial virtual speaker for the current frame based on a quantity of virtual speaker signals of the current frame and the quantity of sound sources of the three-dimensional audio signal.

8. The method according to claim 1, wherein determining the updated virtual speaker for the current frame from the set of candidate virtual speakers comprises:

when the coding efficiency of the initial virtual speaker for the current frame is less than a second threshold, using a preset virtual speaker in the set of candidate virtual speakers as the updated virtual speaker for the current frame, wherein the second threshold is less than the first threshold; or when the coding efficiency of the initial virtual speaker for the current frame is less than the first threshold and greater than the second threshold, using a virtual speaker for a previous frame as the updated virtual speaker for the current frame, wherein the virtual speaker for the previous frame is a virtual speaker used for encoding the previous frame of the three-dimensional audio signal.

9. A system, comprising:

an encoder comprising at least one processor and a memory coupled to the at least one processor to store instructions, which when executed by the at least one processor, cause the encoder to perform the method according to claim 1; and a decoder comprising at least one processor and a memory coupled to the at least one processor to store instructions, which when executed by the at least one processor, cause the decoder to decode a bitstream generated by the encoder.

10. An encoder, comprising:

at least one processor; and a memory configured to store a computer program, which when executed by the at least one processor, cause the at least one processor to perform operations, the operations comprising:

obtaining a current frame of a three-dimensional audio signal;

obtaining coding efficiency of an initial virtual speaker for the current frame based on the current frame of the three-dimensional audio signal, wherein the initial virtual speaker for the current frame belongs to a set of candidate virtual speakers;

when the coding efficiency of the initial virtual speaker for the current frame meets a preset condition, determining an updated virtual speaker for the current frame from the set of candidate virtual speakers, and encoding the current frame based on the updated virtual speaker for the current frame, to obtain a first bitstream; and when the coding efficiency of the initial virtual speaker for the current frame does not meet the preset condition, encoding the current frame based on the initial virtual speaker for the current frame, to obtain a second bitstream;

wherein the preset condition comprises the coding efficiency of the initial virtual speaker for the current frame is less than a first threshold.

11. The encoder according to claim 10, wherein obtaining the coding efficiency of the initial virtual speaker for the current frame comprises:

obtaining a reconstructed current frame of a reconstructed three-dimensional audio signal based on the initial virtual speaker for the current frame; and determining the coding efficiency of the initial virtual speaker for the current frame based on energy of the reconstructed current frame and energy of the current frame.

12. The encoder according to claim 11, wherein the energy of the reconstructed current frame is determined based on a coefficient of the reconstructed current frame, and the energy of the current frame is determined based on a coefficient of the current frame.

13. The encoder according to claim 10, wherein obtaining the coding efficiency of the initial virtual speaker for the current frame comprises:

obtaining a reconstructed current frame of a reconstructed three-dimensional audio signal based on the initial virtual speaker for the current frame;

obtaining a residual signal of the current frame based on the current frame of the three-dimensional audio signal and the reconstructed current frame of the reconstructed three-dimensional audio signal;

obtaining an energy sum of energy of a virtual speaker signal of the current frame and energy of the residual signal; and determining the coding efficiency of the initial virtual speaker for the current frame based on a ratio of the energy of the virtual speaker signal of the current frame to the energy sum.

14. The encoder according to claim 11, wherein obtaining the reconstructed current frame of the reconstructed three-dimensional audio signal comprises:

determining a virtual speaker signal of the current frame based on the initial virtual speaker for the current frame; and determining the reconstructed current frame based on the virtual speaker signal of the current frame.

15. The encoder according to claim 10, wherein obtaining the coding efficiency of the initial virtual speaker for the current frame comprises:

determining a quantity of sound sources based on the current frame of the three-dimensional audio signal; and determining the coding efficiency of the initial virtual speaker for the current frame based on a quantity of initial virtual speakers for the current frame and the quantity of sound sources.

16. The encoder according to claim 10, wherein obtaining the coding efficiency of the initial virtual speaker for the current frame comprises:

determining a quantity of sound sources based on the current frame of the three-dimensional audio signal;

determining a virtual speaker signal of the current frame based on the initial virtual speaker for the current frame; and determining the coding efficiency of the initial virtual speaker for the current frame based on a quantity of virtual speaker signals of the current frame and the quantity of sound sources of the three-dimensional audio signal.

17. A non-transitory computer-readable storage medium comprising computer software instructions, which when executed by at least one processor, cause the at least one processor to perform operations, the operations comprising:

obtaining a current frame of a three-dimensional audio signal;

obtaining coding efficiency of an initial virtual speaker for the current frame based on the current frame of the three-dimensional audio signal, wherein the initial virtual speaker for the current frame belongs to a set of candidate virtual speakers;

when the coding efficiency of the initial virtual speaker for the current frame meets a preset condition, determining an updated virtual speaker for the current frame from the set of candidate virtual speakers, and encoding the current frame based on the updated virtual speaker for the current frame, to obtain a first bitstream; and when the coding efficiency of the initial virtual speaker for the current frame does not meet the preset condition, encoding the current frame based on the initial virtual speaker for the current frame, to obtain a second bitstream;

wherein the preset condition comprises the coding efficiency of the initial virtual speaker for the current frame is less than a first threshold.

18. The non-transitory computer-readable storage medium according to claim 17, wherein obtaining the coding efficiency of the initial virtual speaker for the current frame comprises:

obtaining a reconstructed current frame of a reconstructed three-dimensional audio signal based on the initial virtual speaker for the current frame; and determining the coding efficiency of the initial virtual speaker for the current frame based on energy of the reconstructed current frame and energy of the current frame.

19. A non-transitory computer-readable storage medium comprising a bitstream obtained by using a method for encoding a three-dimensional audio signal, the method comprising:

obtaining a current frame of a three-dimensional audio signal;

obtaining coding efficiency of an initial virtual speaker for the current frame based on the current frame of the three-dimensional audio signal, wherein the initial virtual speaker for the current frame belongs to a set of candidate virtual speakers;

when the coding efficiency of the initial virtual speaker for the current frame meets a preset condition, determining an updated virtual speaker for the current frame from the set of candidate virtual speakers, and encoding the current frame based on the updated virtual speaker for the current frame, to obtain a first bitstream; and when the coding efficiency of the initial virtual speaker for the current frame does not meet the preset condition, encoding the current frame based on the initial virtual speaker for the current frame, to obtain a second bitstream;

wherein the preset condition comprises the coding efficiency of the initial virtual speaker for the current frame is less than a first threshold.

* * * * *